United States Patent
Jo et al.

(10) Patent No.: US 12,045,483 B2
(45) Date of Patent: Jul. 23, 2024

(54) STORAGE DEVICE INCLUDING INDIRECT ACCESS MODULE, METHOD OF OPERATING THE SAME, AND METHOD OF OPERATING STORAGE SYSTEM INCLUDING THE SAME

(71) Applicant: SAMSUNG ELECTRONICS CO., LTD., Suwon-si (KR)

(72) Inventors: Insoon Jo, Hwaseong-si (KR); Jooyoung Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 32 days.

(21) Appl. No.: 17/903,604

(22) Filed: Sep. 6, 2022

(65) Prior Publication Data

US 2023/0205440 A1 Jun. 29, 2023

(30) Foreign Application Priority Data

Dec. 29, 2021 (KR) .......................... 10-2021-0191465

(51) Int. Cl.
G06F 3/06 (2006.01)
(52) U.S. Cl.
CPC ............ *G06F 3/064* (2013.01); *G06F 3/0607* (2013.01); *G06F 3/0679* (2013.01)
(58) Field of Classification Search
CPC ...... G06F 3/064; G06F 3/0607; G06F 3/0679; G06F 3/0659; G06F 3/061; G06F 3/0604; G06F 3/0611; G06F 12/0246; G06F 2212/1024
See application file for complete search history.

(56) References Cited

U.S. PATENT DOCUMENTS

| | | | |
|---|---|---|---|
| 5,991,862 A | 11/1999 | Ruane | |
| 6,970,959 B1 * | 11/2005 | O'Hare | G06F 11/2012 709/221 |
| 8,285,967 B1 * | 10/2012 | Veeraswamy | G06F 16/183 707/821 |
| 8,499,138 B2 | 7/2013 | Accapadi et al. | |
| 8,918,621 B1 | 12/2014 | Taylor | |
| 9,191,464 B2 | 11/2015 | Powell et al. | |
| 9,547,586 B2 | 1/2017 | Chang et al. | |
| 10,552,374 B2 * | 2/2020 | Desai | G06F 16/1727 |
| 2014/0188952 A1 | 7/2014 | Killamsetti et al. | |
| 2015/0331677 A1 | 11/2015 | Kimura | |
| 2019/0102315 A1 * | 4/2019 | Guim Bernat | G06F 12/0223 |
| 2020/0050400 A1 | 2/2020 | Kim et al. | |

(Continued)

FOREIGN PATENT DOCUMENTS

KR 10-0422801 B1 3/2004

*Primary Examiner* — Edward J Dudek, Jr.
*Assistant Examiner* — Ralph A Verderamo, III
(74) *Attorney, Agent, or Firm* — Sughrue Mion, PLLC

(57) ABSTRACT

A method of operating a storage device which communicates with a host device, includes receiving a request for an access to target data from the host device, executing an indirect access module based on the request, determining, by the indirect access module, a target address indicating a location of the target data based on an access parameter of the request, accessing, by the indirect access module, a data block based on the target address, and providing, by the indirect access module, the host device with the accessed data block or the target data in the accessed data block.

19 Claims, 13 Drawing Sheets

(56) References Cited

U.S. PATENT DOCUMENTS

2022/0413855 A1* 12/2022 Pawlowski ......... G06F 9/30047
2023/0205705 A1*  6/2023 Poremba ................ G06F 12/10
                                                              711/203

* cited by examiner

STORAGE DEVICE INCLUDING INDIRECT ACCESS MODULE, METHOD OF OPERATING THE SAME, AND METHOD OF OPERATING STORAGE SYSTEM INCLUDING THE SAME

CROSS-REFERENCE TO RELATED APPLICATIONS

This application claims priority under 35 U.S.C. § 119 to Korean Patent Application No. 10-2021-0191465 filed on Dec. 29, 2021, in the Korean Intellectual Property Office, the disclosures of which are incorporated by reference herein in their entireties.

BACKGROUND

Embodiments of the present disclosure described herein relate to a storage device, and more particularly, relate to a storage device including an indirect access module, a method of operating the same, and a method of operating a storage system including the storage device.

A memory device stores data in response to a write request and outputs data stored therein in response to a read request. For example, the memory device is classified as a volatile memory device, which loses data stored therein when a power supply is turned off, such as a dynamic random access memory (DRAM) device or a static RAM (SRAM) device, or a non-volatile memory device, which retains data stored therein even when a power supply is turned off, such as a flash memory device, a phase-change RAM (PRAM), a magnetic RAM (MRAM), or a resistive RAM (RRAM).

Nowadays, as sizes of user data, an application, and the like increase, the management of a large amount of data is required. To manage a large amount of data, a non-volatile memory device may use memory blocks having a multi-layer structure. For example, a high layer may include a metadata block, and a low layer may include a data block. As the number of layers increases, a capacity of data capable of being managed may increase. However, because an access to plural metadata blocks is sequentially made, an access to a data block including target data may be delayed. Accordingly, there is required a technique for decreasing the delay due to the access to the data block.

SUMMARY

Embodiments of the present disclosure provide a storage device including an indirect access memory, a method of operating the same, and a method of operating a storage system including the same.

According to an embodiment, a storage device communicates with a host device. A method of operating the storage device includes receiving a request for an access to target data from the host device, executing an indirect access module based on the request, determining, by the indirect access module, a target address indicating a location of the target data based on an access parameter of the request, accessing, by the indirect access module, a data block based on the target address, and providing, by the indirect access module, the host device with the accessed data block or the target data in the accessed data block.

According to an embodiment, a storage system includes a host device and a storage device. A method of operating the storage system includes providing, by the host device, a request for an access to target data, executing, by the storage device, an indirect access module based on the request, determining, by the indirect access module, a target address indicating a location of the target data based on an access parameter of the request, accessing, by the indirect access module, a data block based on the target address, and providing, by the indirect access module, the host device with the accessed data block or the target data in the accessed data block.

According to an embodiment, a storage device includes a non-volatile memory device that stores a plurality of data sets, a first indirect access module that manages a first data set of the plurality of data sets, a host interface circuit that communicates with a host device, and a module manager that receives a first request for a first access to first target data from the host device through the host interface circuit and executes the first indirect access module based on the first request. The first data set includes a first target data block including the first target data and a first metadata block including first metadata, and the first indirect access module, when executed by the module manager, determines a first target address indicating a location of the first target data, based on a first access parameter of the first request and the first metadata, accesses the first target data block based on the first target address, and provides the host interface circuit with the first target data block thus accessed or the first target data in the first target data block thus accessed.

BRIEF DESCRIPTION OF THE FIGURES

The above and other objects and features of the present disclosure will become apparent by describing in detail embodiments thereof with reference to the accompanying drawings.

DETAILED DESCRIPTION

Below, embodiments of the present disclosure will be described in detail and clearly to such an extent that one skilled in the art easily carries out the present disclosure.

Figure 1:
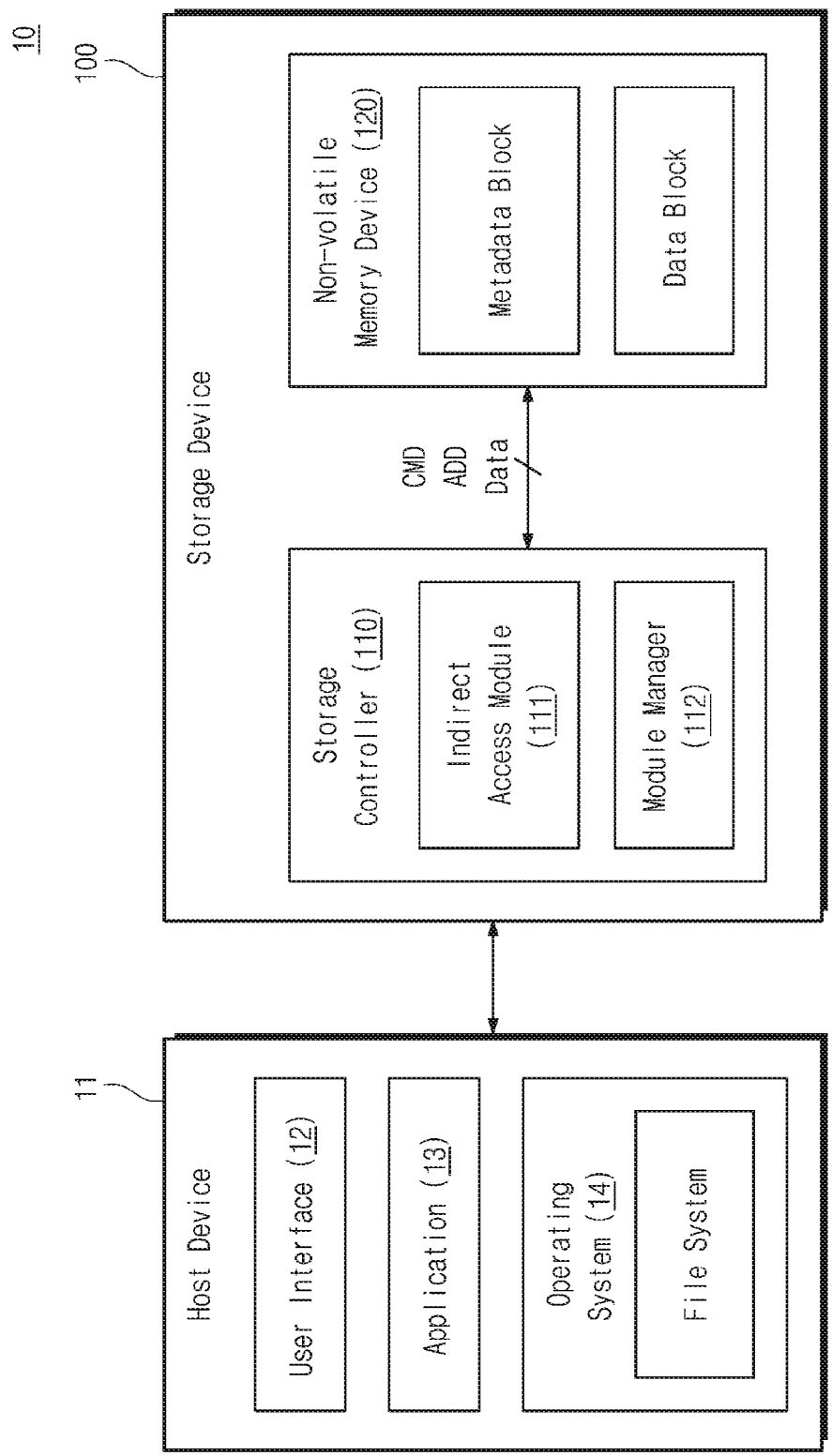
FIG. 1 is a block diagram of a storage system according to an embodiment of the present disclosure.

FIG. 1 is a block diagram of a storage system according to an embodiment of the present disclosure. Referring to FIG. 1, a storage system 10 may include a host device 11 and a storage device 100. In some embodiments, the storage system 10 may include a computing system, which is configured to process a variety of information, such as a personal computer (PC), a notebook, a laptop, a server, a workstation, a tablet PC, a smartphone, a digital camera, and a black box.

The host device 11 may control an overall operation of the storage system 10. For example, the host device 11 may store data in the storage device 100 or may read data stored in the storage device 100.

The host device 11 may include a user interface 12, an application 13, and an operating system 14. The user interface 12 may provide an interface with a user of the storage system 10. For example, the user interface 12 may provide an interface with the user through an external device such as a touchscreen, a monitor, a mouse, a keyboard, a microphone, or a speaker.

The application 13 may refer to a software program designed to perform a specific function. For example, the application 13 may include a word processor, a database program, a web browser, an image editing program, and the like.

The operating system 14 may provide an interface between hardware and software. For example, the operating system 14 may execute the application 13 and may allocate a resource to the application 13. The operating system 14 may automatically manage files through a file system or may manage the files through the file system depending on a request of the application 13. For example, the file system may systematically manage an operation of creating a file, an operation of accessing the file, an operation of opening the file, an operation of changing the file, and an operation of deleting the file, and the like. A file may refer to a set of data. The data set corresponding to the file may be stored in the storage device 100.

The storage device 100 may store data received from the host device 11 or may provide the stored data to the host device 11. The storage device 100 may include a storage controller 110 and a non-volatile memory device 120.

The non-volatile memory device 120 may store data. The storage controller 110 may store data in the non-volatile memory device 120 or may read data stored in the non-volatile memory device 120. The non-volatile memory device 120 may operate under control of the storage controller 110. For example, based on a command CMD indicating an operation and an address ADD indicating a location of data, the storage controller 110 may store the data in the non-volatile memory device 120 or may read the data stored in the non-volatile memory device 120.

In some embodiments, the non-volatile memory device 120 may be a NAND flash memory device, but the present disclosure is not limited thereto. For example, the non-volatile memory device 120 may be one of various storage devices, which retain data stored therein even though a power is turned off, such as a phase-change random access memory (PRAM), a magnetic random access memory (MRAM), a resistive random access memory (RRAM), and a ferroelectric random access memory (FRAM).

The storage controller 110 may include an indirect access module 111 and a module manager 112. The indirect access module 111 may assist an operation of the file system of the operating system 14. In general, because a file system manages a file, target data may be required. The target data may be included in a data block. As metadata, information (e.g., a pointer) indicating a location of the target data may be included in a metadata block.

To obtain target data, a general file system may sequentially access metadata blocks to read metadata, may obtain a target address of the target data from the metadata, and may read the target data of a data block based on the obtained target address. A processor of the host device 11 may be more excellent in performance than a processor of the storage controller 110. However, in the case where the host device 11 directly processes metadata, because operations of receiving the metadata and returning the target address are performed, an input/output (I/O) load between the host device 11 and the storage device 100 may increase. This may mean that data processing is delayed.

According to an embodiment of the present disclosure, the indirect access module 111 may assist an operation that is necessary for the file system of the host device 11 to process metadata. For example, the indirect access module 111 may receive an access request for target data from the host device 11. The access to the target data may include the direct access to the target data and the indirect access to the target data. For example, the direct access may refer to an operation of accessing a data block in which target data are stored, and the indirect access may refer to an operation of accessing a metadata block in which metadata indicating a target address are stored.

A request for an access may include an access parameter. The access parameter may indicate information that is received from the host device 11 and is necessary to retrieve target data or metadata corresponding to the target data. For example, the access parameter may include an identifier of target data, indirect layer information, return information, and the like. The identifier of the target data may mean a file byte offset, a record key, or the like for identifying the target data. The indirect layer information may indicate a specific indirect layer of a plurality of indirect layers included in the non-volatile memory device 120. The return information may define a type of data to be returned to the host device 11.

The indirect access module 111 may fetch metadata of a metadata block based on the access parameter of the request. The indirect access module 111 may determine a target address based on the access parameter and the fetched metadata. The indirect access module 111 may fetch target data in a data block based on the target address. The indirect access module 111 may return the target data to the host device 11.

That is, the indirect access module 111 may instead perform a metadata-related operation that a general file system has performed, and thus, target data that the host device 11 requests may be provided directly without an additional I/O. The host device 11 may obtain target data through one request and one response. How the I/O load is reduced by the indirect access module 111 will be described in detail with reference to FIGS. 4 and 5.

The module manager 112 may manage the indirect access module 111. The module manager 112 may execute the indirect access module 111 based on a request for an access (hereinafter referred to as an "access request") received from the host device 11.

The indirect access module 111 and the module manager 112 may be implemented in the form of hardware, software, or a combination thereof. For example, in the case where the indirect access module 111 and the module manager 112 are implemented with hardware, the indirect access module 111 and the module manager 112 may be included in the storage controller 110 in the form of a separate module, circuit, or chip.

For example, in the case where the indirect access module 111 and the module manager 112 are implemented by software, the non-volatile memory device 120 may be used as a firmware memory together with a read only memory (ROM) in the storage controller 110. Instructions corresponding to the indirect access module 111 and the module manager 112 may be stored in the non-volatile memory device 120 and may be loaded to the volatile memory (e.g., a main memory) of the storage controller 110 to communicate with the host device 11.

The non-volatile memory device 120 may include a metadata block and a data block. The metadata block may include a plurality of metadata. The metadata may include at least one of a variety of information about data, such as a type of data, a location of the data, a way to access the data, and identification information. The data block may include a plurality of data. The data may correspond to a file that a file system manages. For example, the data block may include target data that the host device 11 requests.

In some embodiments, the metadata may indicate a location of data. For example, the metadata may include an address of data or may include an address of any other metadata indicating the address of the data. A structure in which data are indicated by a plurality of metadata may be referred to as a "multi-layer structure". The multi-layer structure will be described in detail with reference to FIG. 6 together.

As described above, according to an embodiment of the present disclosure, there may be provided the storage device 100 that includes the indirect access module 111 assisting a metadata-related operation of the host device 11. The indirect access module 111 may process metadata and may provide the host device 11 with the direct access to target data. Accordingly, the I/O load between the host device 11 and the storage device 100 may be reduced, and a speed at which a data block is accessed may be improved.

Figure 2:
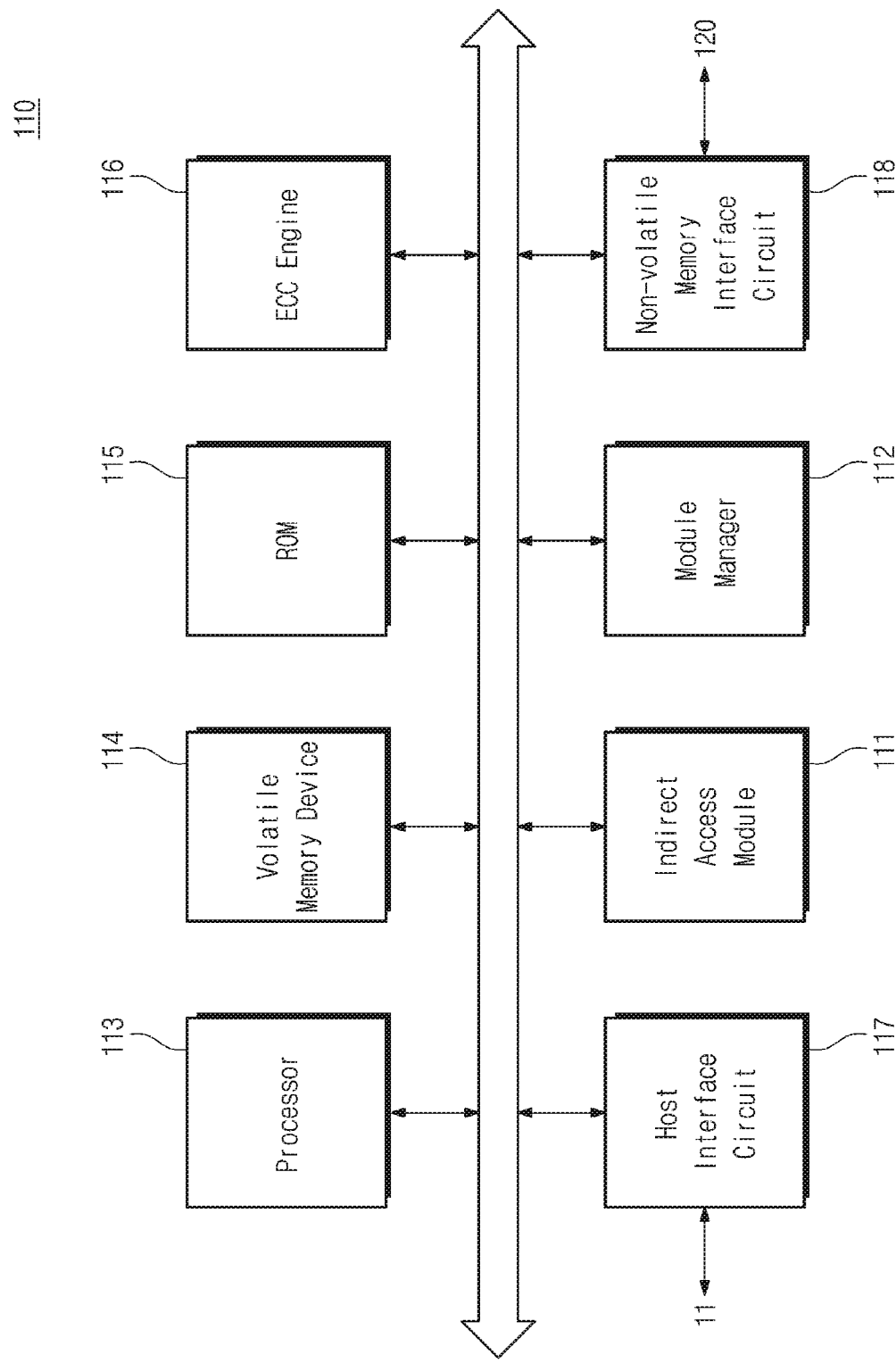
FIG. 2 is a block diagram illustrating a storage controller of FIG. 1 in detail, according to some embodiments of the present disclosure.

FIG. 2 is a block diagram illustrating a storage controller of FIG. 1 in detail, according to some embodiments of the present disclosure. Referring to FIGS. 1 and 2, the storage controller 110 may communicate with the host device 11 and the non-volatile memory device 120. The storage controller 110 may include the indirect access module 111, the module manager 112, a processor 113, a volatile memory device 114, a read only memory (ROM) 115, an error correcting code (ECC) engine 116, a host interface circuit 117, and a non-volatile memory interface circuit 118. The indirect access module 111 and the module manager 112 are similar to the indirect access module 111 and the module manager 112 of FIG. 1, and thus, additional description will be omitted to avoid redundancy.

In some embodiments, the indirect access module 111 and the module manager 112 may be implemented by software. In detail, the storage device 100 may include a firmware memory. The firmware memory may store a variety of information, which is necessary for the storage device 100 to operate, in the form of instructions. As the processor 113 executes the instructions stored in the firmware memory (i.e., the processor 113 loads the instructions to the volatile memory device 114), the indirect access module 111 and the module manager 112 may be executed or implemented. Because the indirect access module 111 and the module manager 112 are implemented regardless of the operating system 14 of the host device 11, the indirect access module 111 and the module manager 112 may be compatible with various kinds of operating systems. However, the present disclosure is not limited thereto. For example, the indirect access module 111 and the module manager 112 may be implemented with a separate hardware device(s) or may be implemented with a combination of hardware and software.

The processor 113 may control an overall operation of the storage controller 110. The volatile memory device 114 may be used as a main memory, a buffer memory, a cache memory, or a working memory of the storage controller 110. For example, the volatile memory device 114 may be implemented with a static random access memory (SRAM) or a dynamic random access memory (DRAM). In some embodiments, the indirect access module 111 and the module manager 112 loaded to the volatile memory device 114 may process a request for accessing target data, which is received from the host device 11. The ROM 115 may be used as a read only memory that stores information necessary for the operation of the storage controller 110.

The ECC engine 116 may detect and correct an error of data read from the non-volatile memory device 120. For example, the ECC engine 116 may have an error correction capability of a given level. The ECC engine 116 may correct an error of data not exceeding the error correction capability and may process data having an error level (e.g., the number of flipped bits) exceeding the error correction capability as an uncorrectable error.

The storage controller 110 may communicate with the host device 11 through the host interface circuit 117. The host interface circuit 117 may provide a host interface layer (HIL). In some embodiments, the host interface circuit 117 may be implemented based on at least one of various interfaces such as a serial ATA (SATA) interface, a peripheral component interconnect express (PCIe) interface, a serial attached SCSI (SAS), a nonvolatile memory express (NVMe) interface, and an universal flash storage (UFS) interface.

The storage controller 110 may communicate with the non-volatile memory device 120 through the non-volatile memory interface circuit 118. In some embodiments, the non-volatile memory interface circuit 118 may be implemented based on a NAND interface.

Figure 3:
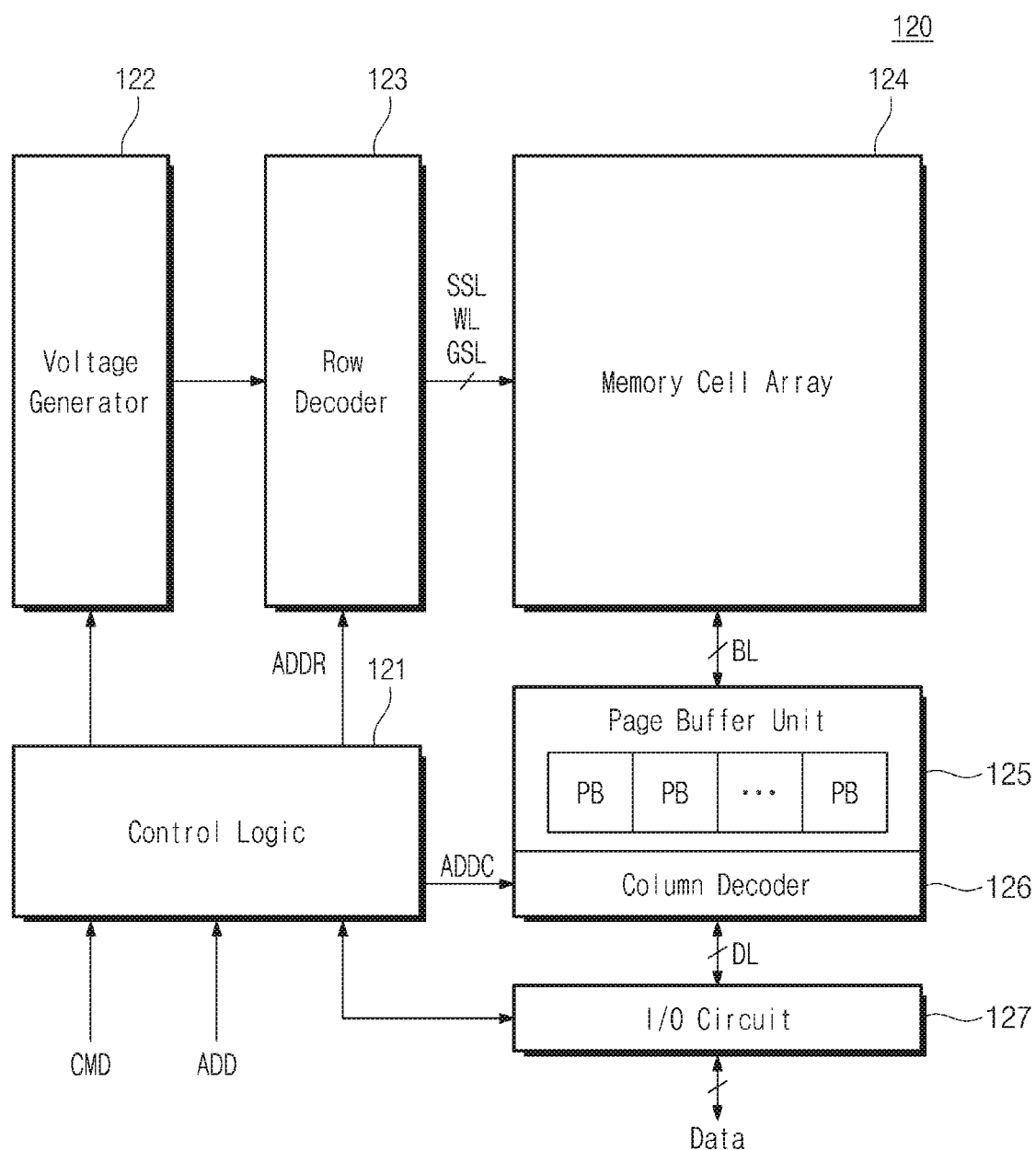
FIG. 3 is a block diagram illustrating a non-volatile memory device of FIG. 1 in detail, according to some embodiments of the present disclosure.

FIG. 3 is a block diagram illustrating a non-volatile memory device of FIG. 1 in detail, according to some embodiments of the present disclosure. Referring to FIGS. 1 and 3, the non-volatile memory device 120 may communicate with the storage controller 110. For example, the non-volatile memory device 120 may receive the address ADD and the command CMD from the storage controller 110. The non-volatile memory device 120 may exchange data with the storage controller 110.

The non-volatile memory device 120 may include control logic 121, a voltage generator 122, a row decoder 123, a memory cell array 124, a page buffer unit 125, a column decoder 126, and an input/output (I/O) circuit 127. The metadata block and the data block of FIG. 1 may be included in the memory cell array 124.

The control logic 121 may receive the command CMD and the address ADD from the storage controller 110. The command CMD may refer to a signal indicating an operation to be performed by the non-volatile memory device 120, such as a read operation, a write operation, or an erase operation. The address ADD may include a row address ADDR and a column address ADDC. The control logic 121 may generate the row address ADDR and the column address ADDC based on the address ADD.

Under control of the control logic 121, the voltage generator 122 may control voltages to be applied to the memory cell array 124 through the row decoder 123.

The row decoder 123 may receive the row address ADDR from the control logic 121. The row decoder 123 may be connected with the memory cell array 124 through string selection lines SSL, word lines WL, and ground selection lines GSL. The row decoder 123 may decode the row address ADDR and may control voltages to be applied to the string selection lines SSL, the word lines WL, and the ground selection lines GSL based on a decoding result and a voltage(s) received from the voltage generator 122.

The memory cell array 124 may include a plurality of memory cells. Each of the memory cells may have a threshold voltage level corresponding to data. The memory cells may be arranged in a row direction and a column direction. Some of the memory cells may correspond to the metadata block and the data block of FIG. 1. Others of the memory cells may store the instructions corresponding to the indirect access module 111 and the module manager 112 implemented by software in FIG. 1. In some embodiments, the metadata block and the memory block may correspond to a physical erase unit of the non-volatile memory device 120, but the present disclosure is not limited thereto. For example, the physical erase unit may be changed to a page unit, a word line unit, a sub-block unit, or the like.

The page buffer unit 125 may include a plurality of page buffers PB. The page buffer unit 125 may be connected with the memory cell array 124 through the bit lines BL. The page buffer unit 125 may read data from the memory cell array 124 in units of page, by sensing voltages of the bit lines BL.

The column decoder 126 may receive the column address ADDC from the control logic 121. The column decoder 126 may decode the column address ADDC and may provide the data read by the page buffer unit 125 to the I/O circuit 127 based on a decoding result.

The column decoder 126 may receive data from the I/O circuit 127 through data lines DL. The column decoder 126 may receive the column address ADDC from the control logic 121. The column decoder 126 may decode the column address ADDC and may provide the data received from the I/O circuit 127 to the page buffer unit 125 based on a decoding result. The page buffer unit 125 may store the data provided from the I/O circuit 127 in the memory cell array 124 through the bit lines BL in units of page.

The I/O circuit 127 may be connected with the column decoder 126 through the data lines DL. The I/O circuit 127 may provide data received from the storage controller 110 to the column decoder 126 through the data lines DL. The I/O circuit 127 may output data received through the data lines DL to the storage controller 110.

Figure 4:
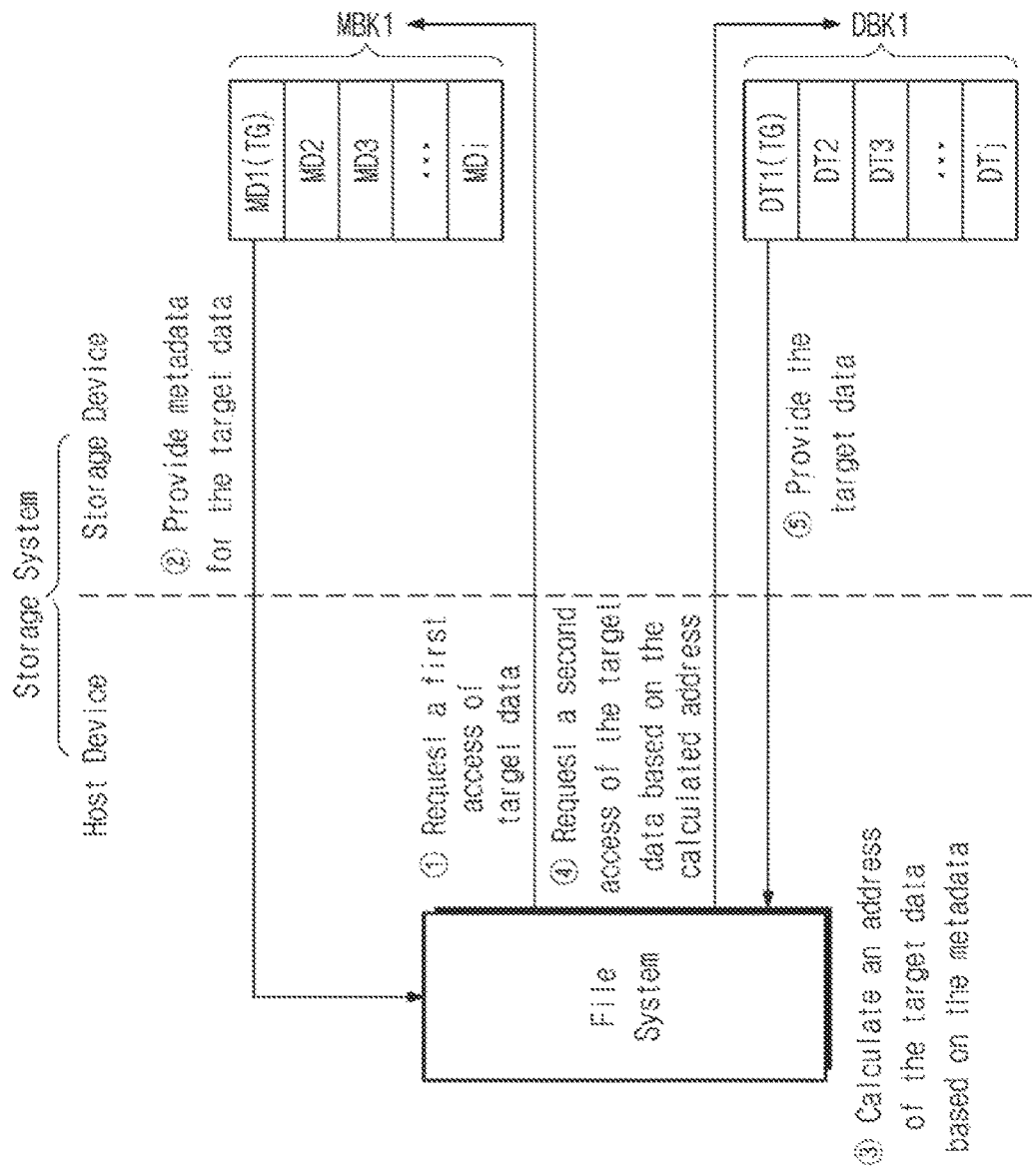
FIG. 4 is a diagram describing a data processing method of a related art storage system.

FIG. 4 is a diagram describing a data processing method of a related art storage system. Referring to FIG. 4, a storage system may include a host device and a storage device. The host device may include a file system. The file system manages files corresponding to an application. The storage device may include first to N-th metadata blocks MBK1, MBK2, ..., MBKN. Each of the first to N-th metadata blocks MBK1 to MBKN may include first to i-th metadata. The storage device may include first to M-th data blocks DBK1, DBK2, ..., DBKM. Each of the first to M-th data blocks DBK1 to DBKM may include first to j-th data DT1 to DTj. Herein, N, M, i, and j may be arbitrary natural numbers.

Below a method in which a related art storage system processes target data will be described.

In a first operation ①, the file system of the host device may request a first access to target data. The first access may be an indirect access to the target data or a direct access to metadata corresponding to the target data. The target data may be final data that the file system requires. The host device may issue a command such that a request for the first access to the target data is provided to the storage device. For example, the target data may be the first data DT1 of the first data block DBK1 (for better understanding of the present disclosure, in FIG. 4, "TG" is written side-by-side together with target data and metadata corresponding to the target data).

In a second operation ②, the storage device may read first metadata MD1 of the first metadata block MBK1 based on the request for the first access in the first operation ①. The first metadata MD1 of the first metadata block MBK1 may be metadata associated with the target data. The storage device may provide the first metadata MD1 of the first metadata block MBK1 to the host device.

In a third operation ③, the file system of the host device may calculate an address of the target data based on the metadata received through the second operation ②. That is, a processor of the host device may process the metadata and may obtain an address corresponding to the metadata. For example, the file system may calculate an address of the first data DT1 in the first data block DBK1, based on the first metadata MD1 of the first metadata block MBK1.

In a fourth operation ④, the file system of the host device may request a second access to the target data, based on the address calculated in the third operation ③. For example, the second access may be a direct access to the target data. The file system may access the first data block DBK1 based on the address calculated from the first metadata MD1.

In a fifth operation ⑤, the storage device may provide the host device with the target data as a response to the request for the second access corresponding to the fourth operation ④. For example, the storage device may receive the second access request including the calculated address from the host device. The storage device may return the first data DT1 of the first data block DBK1 to the host device as a response to the request.

As described above, in the related art storage system, an operation of processing metadata (i.e., an operation in which an address is calculated from metadata) may be performed by the host device. Independently of requesting target data or receiving target data, the related art storage system may perform the second operation ② in which metadata are transferred and the fourth operation ④ in which an access is made based on a calculated address. The metadata processing operation may cause an increase in the I/O load between the host device and the storage device. The way to reduce the I/O load will be described with reference to FIG. 5.

Figure 5:
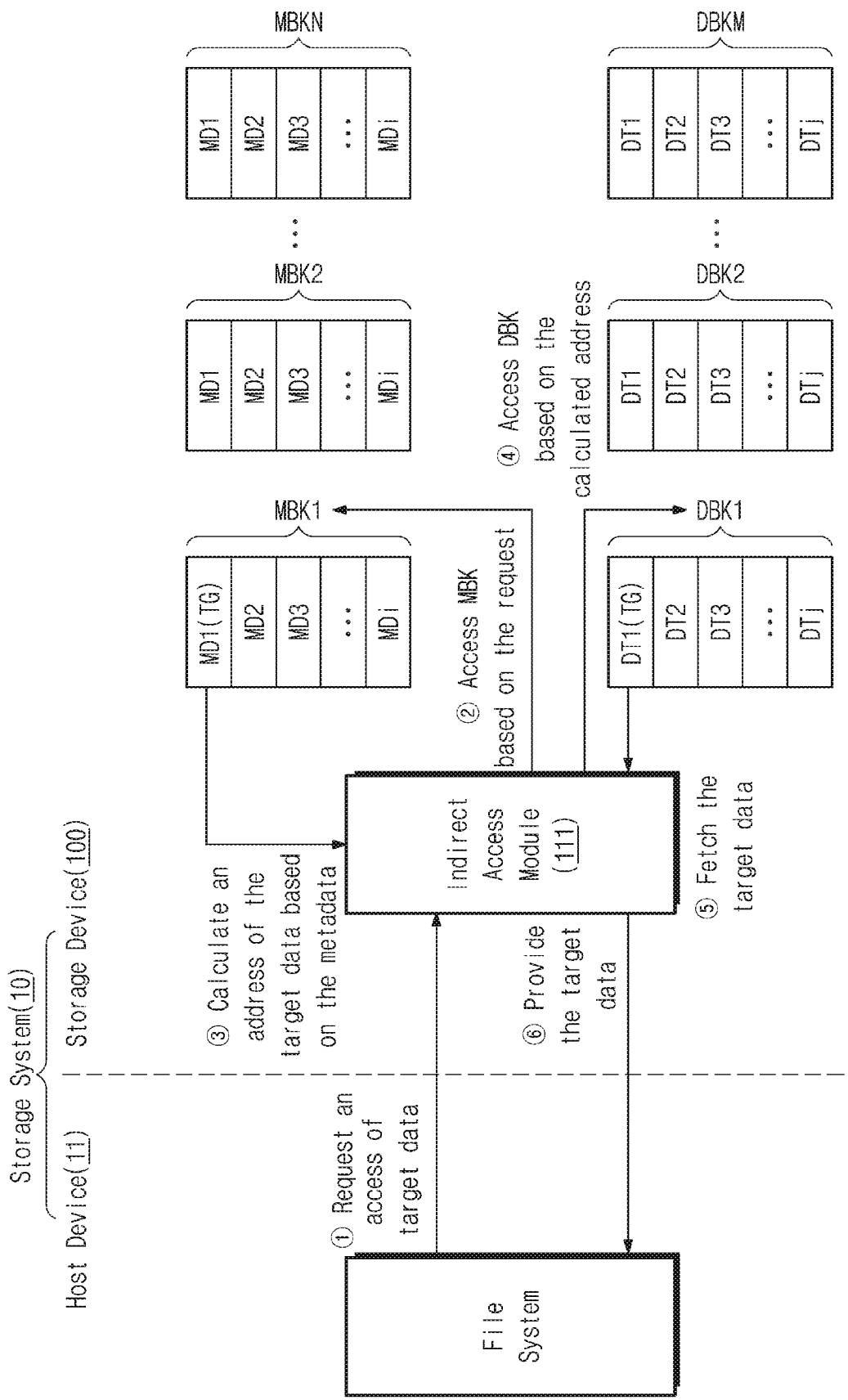
FIG. 5 is a diagram illustrating a data processing method according to an embodiment of the present disclosure.

FIG. 5 is a diagram illustrating a data processing method according to an embodiment of the present disclosure. Referring to FIG. 5, the storage system 10 may include the host device 11 and the storage device 100. The storage system 10, the host device 11, and the storage device 100 may respectively correspond to the storage system 10, the host device 11, and the storage device 100 of FIG. 1.

The host device 11 may include a file system. The file system manages files corresponding to an application. The storage device 100 may include the first to N-th metadata blocks MBK1 to MBKN. Each of the first to N-th metadata blocks MBK1 to MBKN may include first to i-th metadata.

The storage device 100 may include the first to M-th data blocks DBK1 to DBKM. Each of the first to M-th data blocks DBK1 to DBKM may include first to j-th data DT1 to DTj. Herein, N, M, i, and j may be arbitrary natural numbers.

The storage device 100 may include the indirect access module 111. The indirect access module 111 may assist an operation of the file system of the host device 11. The indirect access module 111 may correspond to the indirect access module 111 of FIGS. 1 and 2.

Below, a method in which the storage system 10 according to some embodiments of the present disclosure processes target data will be described.

In a first operation ①, the file system of the host device 11 may request an access to the target data. The access to the target data may include the direct access to the target data and the indirect access to the target data. For example, the direct access may refer to an operation of accessing a data block in which target data are stored, and the indirect access may refer to an operation of accessing a metadata block in which metadata indicated by a target address are stored. The target data may be final data that the file system requires.

The host device 11 may issue a command such that a request for the access to the target data is provided to the storage device 100. For example, the target data may be the first data DT1 of the first data block DBK1 (for better understanding of the present disclosure, in FIG. 5, "TG" is written side-by-side together with target data and metadata corresponding to the target data).

In a second operation ②, the indirect access module 111 of the storage device 100 may access a metadata block based on an access parameter of the request received through the first operation ①. The access parameter may indicate information that is received from the host device 11 and is necessary to retrieve the target data or metadata corresponding to the target data. For example, the access parameter may include an identifier of the target data, indirect layer information, return information, and the like.

For example, the indirect access module 111 may access the first metadata MD1 of the first metadata block MBK1 based on the access parameter of the request. The first metadata MD1 may be metadata associated with the target data.

In a third operation ③, the indirect access module 111 of the storage device 100 may calculate an address of the target data based on the access parameter and the metadata. For example, the indirect access module 111 may access the first metadata MD1 of the first metadata block MBK1 accessed through the second operation ②. The indirect access module 111 may calculate an address of the first data DT1 in the first data block DBK1, based on the access parameter and the first metadata MD1.

In a fourth operation ④, the indirect access module 111 may access a data block having target data, based on the address calculated in the third operation ③ and the access parameter. For example, the indirect access module 111 may access the first data DT1 of the first data block DBK1, based on the address calculated from the first metadata MD1 of the first metadata block MBK1.

In a fifth operation ⑤, the indirect access module 111 may fetch the target data located at the address calculated in the third operation ③. For example, the indirect access module 111 may fetch the first data DT1 of the first data block DBK1 accessed through the fourth operation ④, based on the calculated address.

In some embodiments, based on a return type included in the access parameter, the indirect access module 111 may fetch the target data or may fetch the data block including the target data.

In a sixth operation ⑥, the indirect access module 111 may provide the host device 11 with the target data fetched through the fifth operation ⑤. For example, the indirect access module 111 may provide the file system of the host device 11 with the first data DT1 thus fetched. The target data provided through the sixth operation ⑥ may be provided to the host device 11 as a response to the request in the first operation ①.

In some embodiments, based on the return type included in the access parameter, the indirect access module 111 may return the target data or may return the data block including the target data. The indirect access module 111 may determine whether to return metadata based on the return type included in the access parameter, when the determination is made to return the metadata, the indirect access module 111 may determine whether to return the metadata or whether to return a data block including the metadata.

As described above, according to an embodiment of the present disclosure, the indirect access module 111 of the storage device 100 may process the metadata. Without intervention of the host device 11, the storage device 100 may fetch metadata, may obtain an address from the metadata, and may access a data block corresponding to the address. Unlike the related art storage system of FIG. 4, as the I/O load between the host device and the storage device due to metadata processing, is reduced, the storage system 10 in which a data block access speed is improved may be provided.

Figure 6:
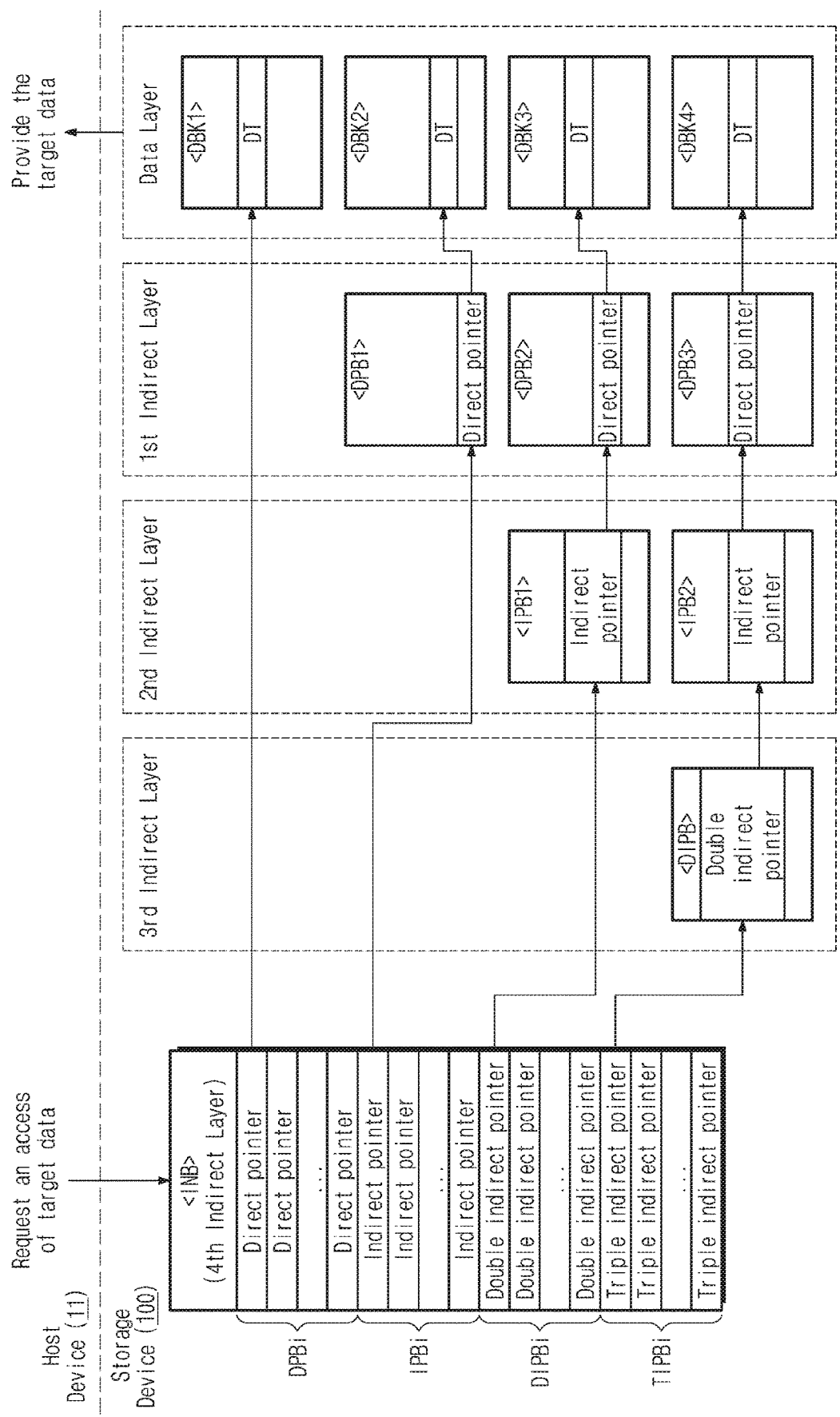
FIG. 6 is a diagram describing a data processing method according to some embodiments of the present disclosure.

FIG. 6 is a diagram describing a data processing method according to some embodiments of the present disclosure. A method in which a storage system according to some embodiments of the present disclosure processes metadata will be described with reference to FIG. 6.

According to some embodiments of the present disclosure, the storage system may support a Linux operating system. For example, the host device 11 may support a file system of the Linux operating system. The storage device 100 may manage an inode according to the file system of the Linux operating system. The inode may be generated for each file and may include pointers for accessing a plurality of data, respectively.

The host device 11 may provide a request for the access to target data to the storage device 100. The storage device 100 may provide the target data to the host device 11 based on the access request for the target data.

The storage device 100 may include a data layer, a first indirect layer, a second indirect layer, a third indirect layer, and a fourth indirect layer. The data layer may include at least one data block. Each of the first to fourth indirect layers may include at least one metadata block.

Each of the first to fourth indirect layers may be referred to as a high layer when it is relatively close to the host device 11 and may be referred to as a low layer when it is relatively close to the data layer. For example, the first indirect layer of the first to fourth indirect layers may be referred to as a "lowest indirect layer" The second indirect layer may be a lower layer compared to the third indirect layer but may be a high layer compared to the first indirect layer. The third indirect layer may be a lower layer compared to the fourth indirect layer but may be a high layer compared to the second indirect layer. The fourth indirect layer of the first to fourth indirect layers may be referred to as a "highest indirect layer"

When a request for the access to target data is received from the host device 11, the storage device 100 may access an inode block INB. The storage device 100 may access another pointer or data based on a pointer of the inode block INB and may return final target data to the host device 11.

The inode block INB may be a metadata block included in the fourth indirect layer. The inode block INB may include a direct pointer block DPBi, an indirect pointer block IPBi, a double indirect pointer block DIPBi, and a triple indirect pointer block TIPBi.

The direct pointer block DPBi may include a plurality of direct pointers. A direct pointer may refer to one of a variety of information included in metadata. A direct pointer may be used to directly access a data layer without separately passing through any other metadata blocks.

For example, a direct pointer of the direct pointer block DPBi may point data DT of the first data block DBK1 in the data layer. To prevent a drawing from being complicated, only a correspondence relationship of one direct pointer is illustrated in FIG. 6, but pointers of the direct pointer block DPBi may point any other data in the data layer.

The indirect pointer block IPBi may include a plurality of indirect pointers. Below, for better understanding, an indirect pointer is intended to refer to a single indirect pointer. An indirect pointer may refer to one of a variety of information included in metadata. An indirect pointer may be used to access the data layer through the first indirect layer.

For example, an indirect pointer of the indirect pointer block IPBi may point a direct pointer of the first direct pointer block DPB1 of the first indirect layer. The direct pointer of the first direct pointer block DPB1 may point data DT of the second data block DBK2 in the data layer.

The double indirect pointer block DIPBi may include a plurality of double indirect pointers. A double indirect pointer may refer to one of a variety of information included in metadata. A double indirect pointer may be used to sequentially pass through the second indirect layer and the first indirect layer to access the data layer.

For example, a double indirect pointer of the double indirect pointer block DIPBi may point an indirect pointer of a first indirect pointer block IPB1 of the second indirect layer. The indirect pointer of the first indirect pointer block IPB1 may point a direct pointer of a second direct pointer block DPB2 of the first indirect layer. The direct pointer of the second direct pointer block DPB2 may point data DT of the third data block DBK3 in the data layer.

The triple indirect pointer block TIPBi may include a plurality of triple indirect pointers. A triple indirect pointer may refer to one of a variety of information included in metadata. A triple indirect pointer may be used to sequentially pass through the third indirect layer, the second indirect layer, and the first indirect layer to access the data layer.

For example, a triple indirect pointer of the triple indirect pointer block TIPBi may point a double indirect pointer of a double indirect pointer block DIPB of the third indirect layer. The double indirect pointer of the double indirect pointer block DIPB may point an indirect pointer of a second indirect pointer block IPB2 of the second indirect layer. The indirect pointer of the second indirect pointer block IPB2 may point a direct pointer of a third direct pointer block DPB3 of the first indirect layer. The direct pointer of the third direct pointer block DPB3 may point data DT of the fourth data block DBK4 in the data layer.

In some embodiments, depending on the request of the host device 11, the storage device 100 may return the target data together with pointers corresponding to the target data.

For example, the request from the host device 11 may include an access parameter. The access parameter may include return information. When returning the target data as a result of accessing the data layer, based on the return information, the storage device 100 may return only the target data or may return the target data together with some or all of pointers corresponding to the target data. For example, in the case where the return information requests the return of all pointers and target data are indicated by a triple indirect pointer of the inode block INB, the storage device 100 may return, to the host device 11, the target data together with a triple indirect pointer, a double indirect pointer, an indirect pointer, and a direct pointer corresponding to the target data.

Alternatively, based on the return information of the access parameter, the storage device 100 may return, to the host device 11, 1) a triple indirect pointer block including a triple indirect pointer, 2) a double indirect pointer block including a double indirect pointer, 3) an indirect pointer block including an indirect pointer, 4) a direct pointer block including a direct pointer, and 5) a data block including target data.

In some embodiments, the storage device 100 may receive a request for an access corresponding to a layer lower than a layer of the inode block INB. For example, the storage device 100 may return corresponding pointers together with previous target data to the host device 11. Instead of an address corresponding to a pointer of the inode block INB, the host device 11 may provide the storage device 100 with an address corresponding to a pointer of the first indirect layer as a portion of the access parameter of the request, based on information loaded to a main memory or a cache memory of the host device 11. In this case, instead of performing pointer processing sequentially from the inode block INB, the storage device 100 may start pointer processing from the first indirect layer based on the address received from the host device 11 as a portion of the access parameter.

In some embodiments, as the number of indirect layers increases, a storage capacity may increase, but a data access may be delayed. For example, in the case where the inode block INB uses only a direct pointer, the inode block INB may manage a file whose size is 4 KB. In the case where the inode block INB uses an indirect pointer, the inode block INB may manage a file whose size is 2 MB. In the case where the inode block INB uses a double indirect pointer, the inode block INB may manage a file whose size is 1 GB. In the case where the inode block INB uses a triple indirect pointer, the inode block INB may manage a file whose size is 512 GB. However, as a level of an indirect pointer becomes higher, the number of times of a block access required to obtain target data may increase. This may mean that data processing is delayed. That a level of an indirect pointer is high may mean that the number of pointers to be sequentially processed to obtain target data is many.

In the case of a related art storage system (e.g., the storage system of FIG. 4) in which the host device calculates an address of data of a next block (e.g., a pointer block or a data block) from a pointer, as a level of a pointer becomes higher, the number of times of an input/output between the host device and the storage device may increase.

In contrast, according to an embodiment of the present disclosure, because the storage device 100 automatically calculates an address of a next block from a pointer without intervention of the host device 11, even though an indirect pointer of a high level is used, the I/O load may not increase. That is, the storage device 100 according to an embodiment of the present disclosure may manage a large amount of data together with minimizing a delay of data processing.

An operation in which the storage device 100 processes a pointer may be performed by an indirect access module in the storage device 100. For example, the storage device 100 may include an indirect access module corresponding to the inode block INB. The indirect access module may be compatible with the Linux operating system. The indirect access module may support a pointer processing operation of a file system, which starts from the inode block INB. An access parameter of a request received from the host device 11 may be used to process at least one of a direct pointer, an indirect pointer, a double indirect pointer, and a triple indirect pointer of the inode block INB. For example, an access parameter received from a host may include an address of a pointer to be processed, and information of a layer in which the pointer is included.

Figure 7:
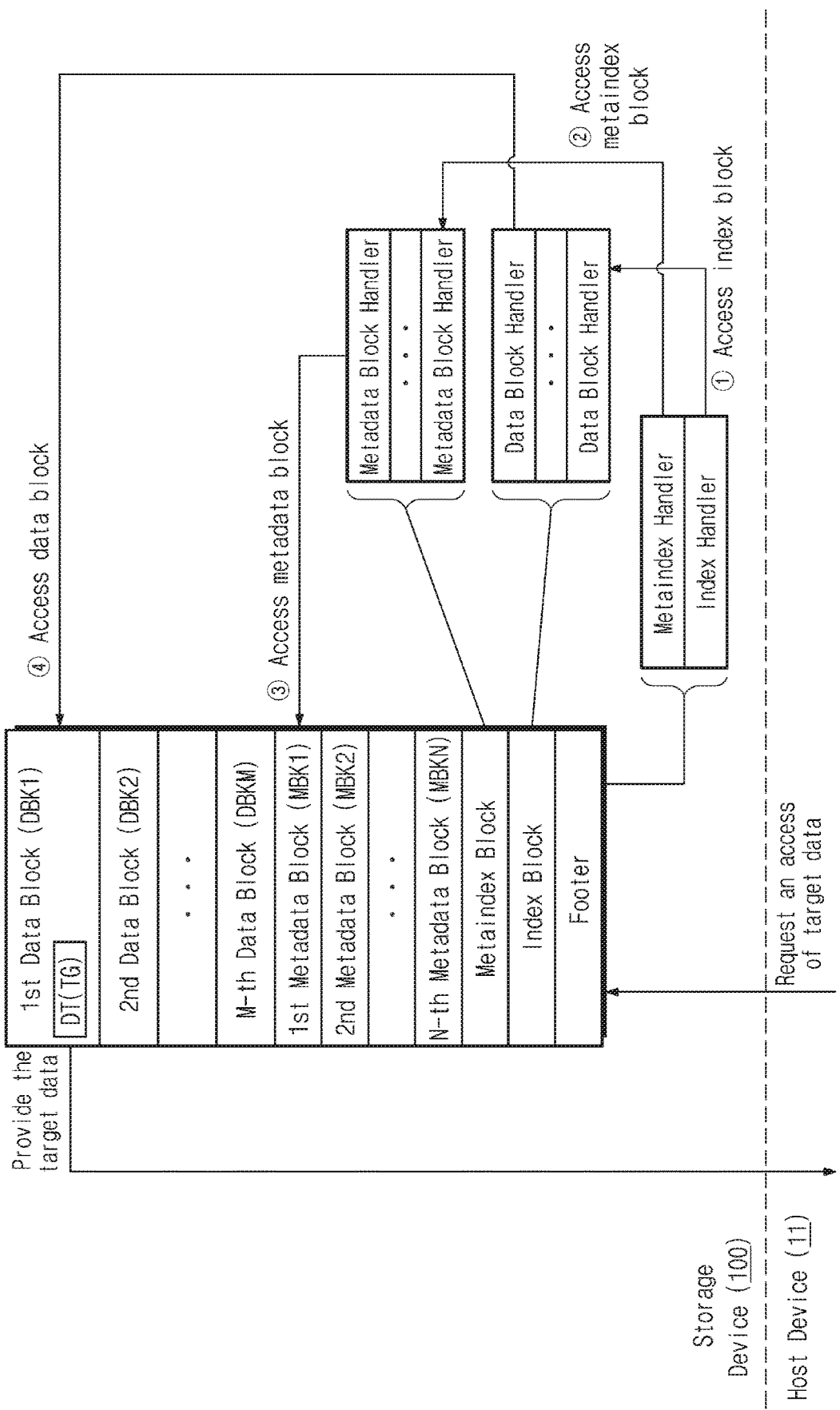
FIG. 7 is a diagram describing a data processing method according to some embodiments of the present disclosure.

FIG. 7 is a diagram describing a data processing method according to some embodiments of the present disclosure. A method in which a storage system according to some embodiments of the present disclosure processes metadata will be described with reference to FIG. 7.

According to some embodiments of the present disclosure, a storage system may support a RocksDB. For example, the host device 11 may provide an access request compatible with a file store format of the RocksDB. The storage device 100 may store a key-value in a serialized certificate store (SST) file structure of the file store formats of the RocksDB.

The host device 11 may provide a request for the access to target data to the storage device 100. The storage device 100 may provide the target data to the host device 11 based on an access parameter of the request. For example, the target data may be the data DT of the first data block DBK1 (for better understanding of the present disclosure, in FIG. 7, "TG" is written side-by-side together with target data).

The storage device 100 may include an SST file. The SST file may include a footer, an index block, a metaindex block, the first to N-th metadata blocks MBK1 to MBKN, and the first to M-th data blocks DBK1 to DBKM. Herein, N and M may be arbitrary natural numbers.

The footer may include a metaindex handler and an index handler. The metaindex handler may indicate a location of metadata. The index handler may indicate a location of a data block handler.

The index block may include a plurality of data block handlers. The data block handler may indicate a location of target data. For example, the data block handler may indicate a data block including the target data from among the first to M-th data blocks DBK1 to DBKM, or may indicate a location of the target data in a corresponding data block.

The metaindex block may include a plurality of metadata block handlers. The metadata block handler may indicate a location of a metadata block or a location of metadata in the metadata block. For example, the metadata block handler may indicate a location of a metadata block necessary to process the target data from among the first to N-th metadata blocks MBK1 to MBKN or may indicate a location of metadata in a metadata block.

Each of the first to M-th data blocks DBK1 to DBKM may include a plurality of data. Data may correspond to a portion of the SST file that is managed by the host device 11.

Each of the first to N-th metadata blocks MBK1 to MBKN may include a plurality of metadata. For example, metadata may include a Bloom filter indicating whether there is a key-value corresponding to target data, a stats for estimating a table size and the number of records, a dictionary for compressing or decompressing a data block, a range deletion for deleting key-values of a given range, and the like. A Bloom filter is a space-efficient probabilistic data structure that is used to test whether an element is a member of a set.

Below, a method in which a storage system according to some embodiments of the present disclosure processes target data will be described. The storage system may include the host device 11 and the storage device 100. The host device 11 may provide a request for the access to target data to the storage device 100.

In a first operation ①, the storage device 100 may access the footer based on the request. The request may include an access parameter. The storage device 100 may refer to the index handler of the footer based on the access parameter and may access the index block. The storage device 100 may check a location of a data block including the data DT, based on the access parameter and the data block handler in the accessed index block.

In a second operation ②, the storage device 100 may refer to the metaindex handler of the footer based on the access parameter and may access the metaindex block.

In a third operation ③, the storage device 100 may read the metadata block handler in the metaindex block accessed through the second operation ② and may access the metadata block based on the access parameter and the metadata block handler. The storage device 100 may process metadata in the accessed metadata block. For example, the storage device 100 may access the first metadata block MBK1 with reference to the metaindex block handler in the metaindex block. The storage device 100 may determine that there is a key-value corresponding to the target data, based on the Bloom filter information of the first metadata block MBK1.

In a fourth operation ④, the storage device 100 may access a data block. For example, the storage device 100 may access the data DT of the first data block DBK1, based on the target data identifier (e.g., a record key corresponding to the target data) included in the access parameter, the location of the data DT obtained in the first operation ①, and the metadata processed in the third operation ③. Afterwards, the storage device 100 may provide the host device 11 with the data DT obtained through the fourth operation ④ or the first data block DBK1 including the data DT.

The operations of the storage device 100 necessary to process the index handler, the metaindex handler, the data block handler, and the metadata block handler may be performed by the indirect access module in the storage device 100. The indirect access module may be compatible with the RocksDB. The access parameter of the request received from the host device 11 may be used to process the metaindex handler and the index handler of the footer.

Figure 8:
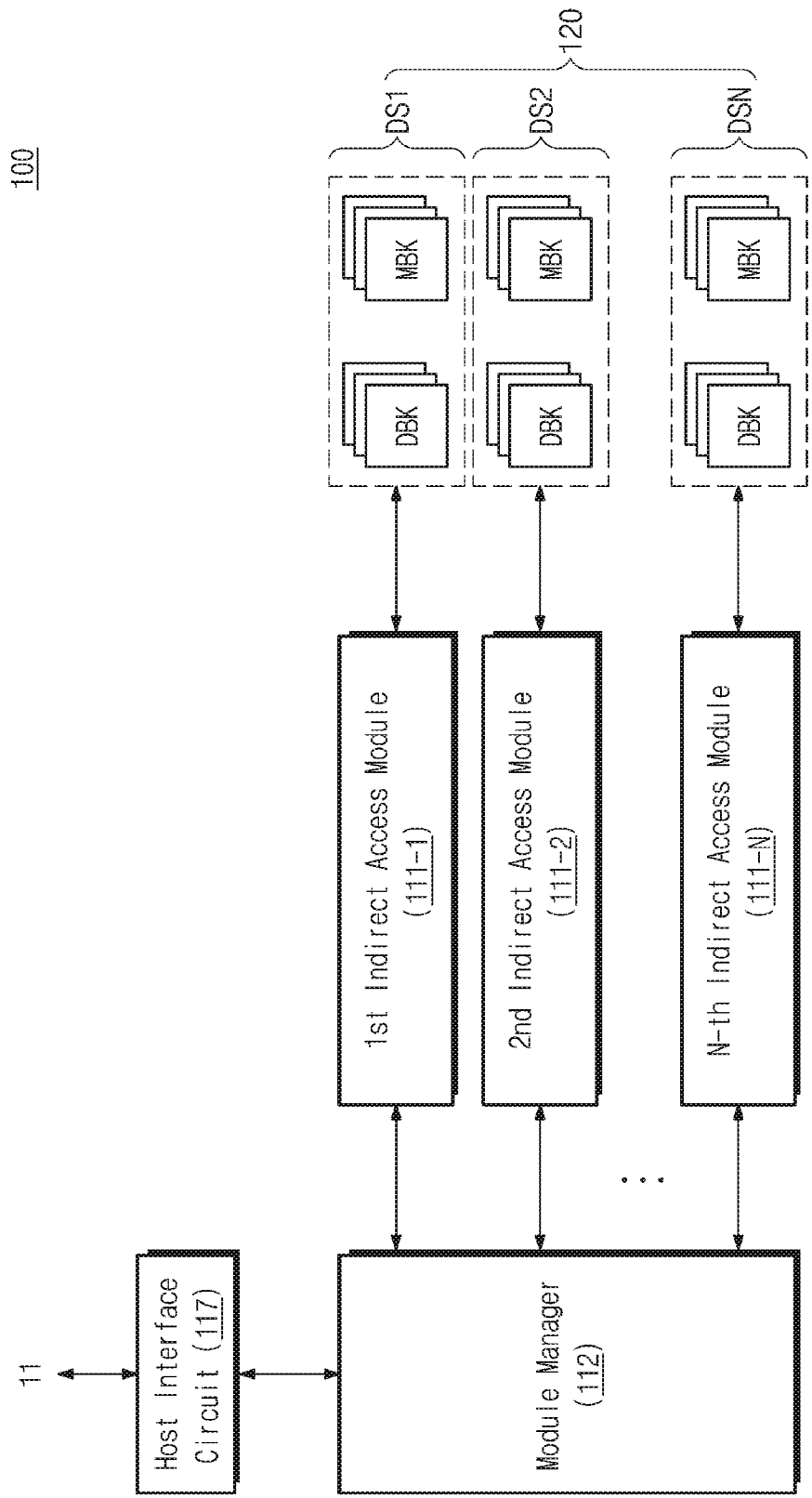
FIG. 8 is a block diagram of a storage device according to some embodiments of the present disclosure.

FIG. 8 is a block diagram of a storage device according to some embodiments of the present disclosure. A block diagram of the storage device 100 is illustrated in FIG. 8. The storage device 100 may correspond to the storage device 100 of FIGS. 1, 5, 6, and 7.

The storage device 100 may communicate with the host device 11. The storage device 100 may receive a request for the access to target data from the host device 11. After performing a metadata-related operation according to the access request for the target data, the storage device 100 may provide the target data to the host device 11.

The storage device 100 may include first to N-th indirect access modules 111-1 to 111-N, the module manager 112, the host interface circuit 117, and the non-volatile memory device 120. Herein, "N" is an arbitrary natural number.

The host interface circuit 117 may provide an interface between the host device 11 and the storage device 100. For example, the host interface circuit 117 may communicate with the host device 11. The host interface circuit 117 may provide the module manager 112 or a corresponding indirect access module with the access request for the target data received from the host device 11. The host interface circuit 117 may provide the target data received from the corresponding indirect access module to the host device 11.

The non-volatile memory device 120 may include first to N-th data sets DS1 to DSN. Each of the first to N-th data sets DS1 to DSN may include a plurality of data blocks DBK and a plurality of metadata blocks MBK. Each of the first to N-th data sets DS1 to DSN may correspond to a file or a software program that is managed by the host device 11, but the present disclosure is not limited thereto.

In some embodiments, the first to N-th indirect access modules 111-1 to 111-N may respectively manage the first to N-th data sets DS1 to DSN. For example, an operating system of the host device 11 may execute a first application and a second application. The first data set DS1 may correspond to the first application, and the second data set DS2 may correspond to the second application. The first indirect access module 111-1 may manage the first data set DS1 associated with the first application (e.g., may manage the access to data included in the first data set DS1). The second indirect access module 111-2 may manage the second data set DS2 associated with the second application (e.g., may manage the access to data included in the second data set DS2).

In detail, in the case where target data are included in the data block DBK of the first data set DS1, based on the access request received from the host device 11, the first indirect access module 111-1 may perform a metadata processing operation, may fetch the target data of the data block DBK, and may provide the fetched target data to the host device 11. In this case, the second to N-th indirect access modules 111-2 to 111-N may not perform the above operation associated with the target data. That is, the storage device 100 may include an indirect access module that manages a program or a file individually.

Figure 9:
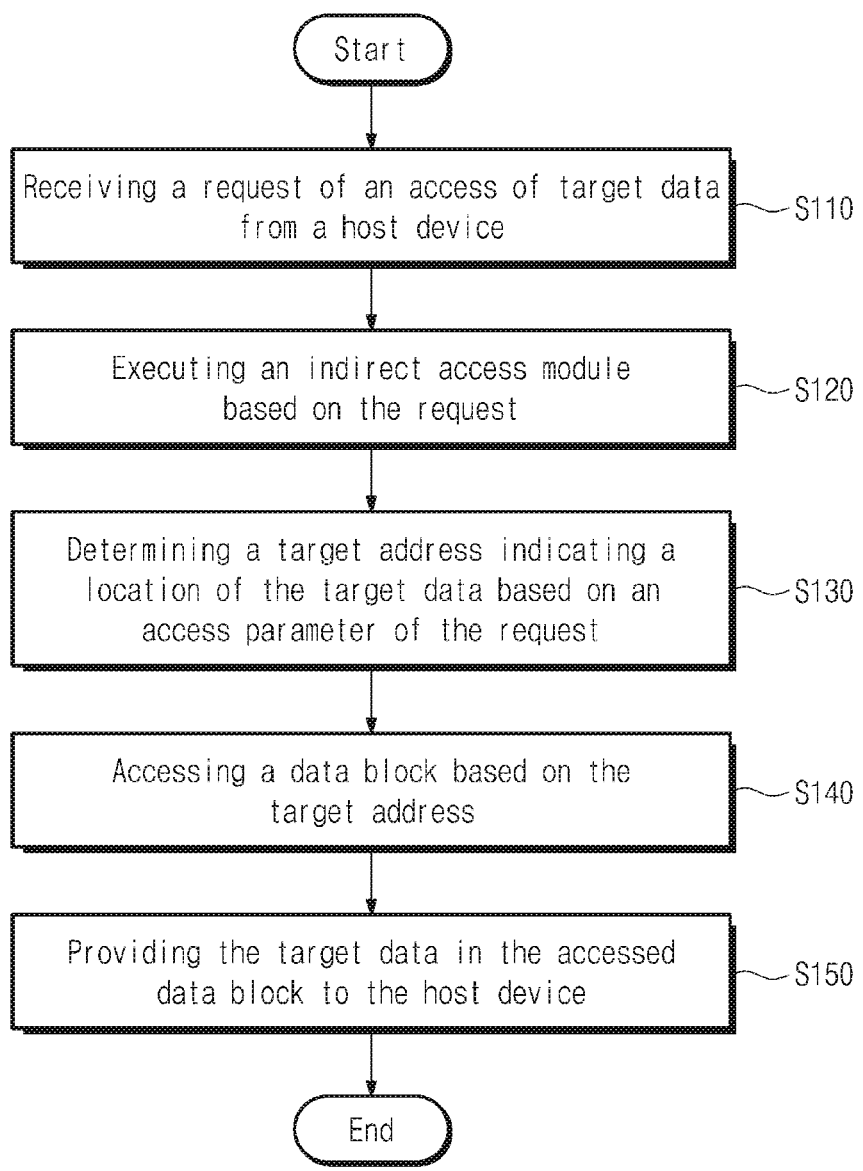
FIG. 9 is a flowchart describing a method of operating a storage device according to some embodiments of the present disclosure.

FIG. 9 is a flowchart describing a method of operating a storage device according to some embodiments of the present disclosure. A method of operating a storage device according to some embodiments of the present disclosure will be described with reference to FIG. 9. The storage device may communicate with a host device. The storage device may correspond to the storage device 100 of FIGS. 1, 5, 6, 7, and 8.

In operation S110, the storage device may receive a request for the access to target data from the host device. The access to the target data may include the direct access to the target data and the indirect access to metadata corresponding to the target data. The target data may be data stored in a data block of the storage device.

In operation S120, the storage device may execute an indirect access module based on the request received in operation S110. For example, the storage device may include a processor, a volatile memory device, and a non-volatile memory device. As the processor executes instructions stored in the non-volatile memory device, the indirect access module may be executed.

In operation S130, the indirect access module of the storage device may determine a target address indicating a location of the target data, based on an access parameter of the request. For example, the request received from the host device may include the access parameter. The access parameter may include information that is necessary to retrieve the target data or metadata corresponding to the target data. For example, the access parameter may include an identifier of target data, indirect layer information, return information, and the like.

The storage device may fetch metadata in a metadata block, based on the access parameter included in the request. The storage device may determine a target address indicating a location of the target data, based on the fetched metadata. In this case, because the storage device automatically determines the target address based on the metadata, without intervention of the host device, the I/O load between the host device and the storage device may not be caused.

In operation S140, the indirect access module of the storage device may access a data block based on the target address. The accessed data block may include the target data requested in operation S110. In this case, the storage device may access the data block including the target data, based on the address determined in operation S130 without the intervention of the host device.

In operation S150, the indirect access module of the storage device may provide the target data in the accessed data block to the host device. That is, the host device may obtain the target data based on the I/O operation of providing the request in operation S110 and receiving the target data in operation S150.

In some embodiments, based on return information included in the access parameter, the indirect access module may determine whether to return the target data or may return the data block including the target data. The indirect access module may provide the host device with the data block accessed in operation S140 or the target data in the data block based on the return information.

Figure 10:
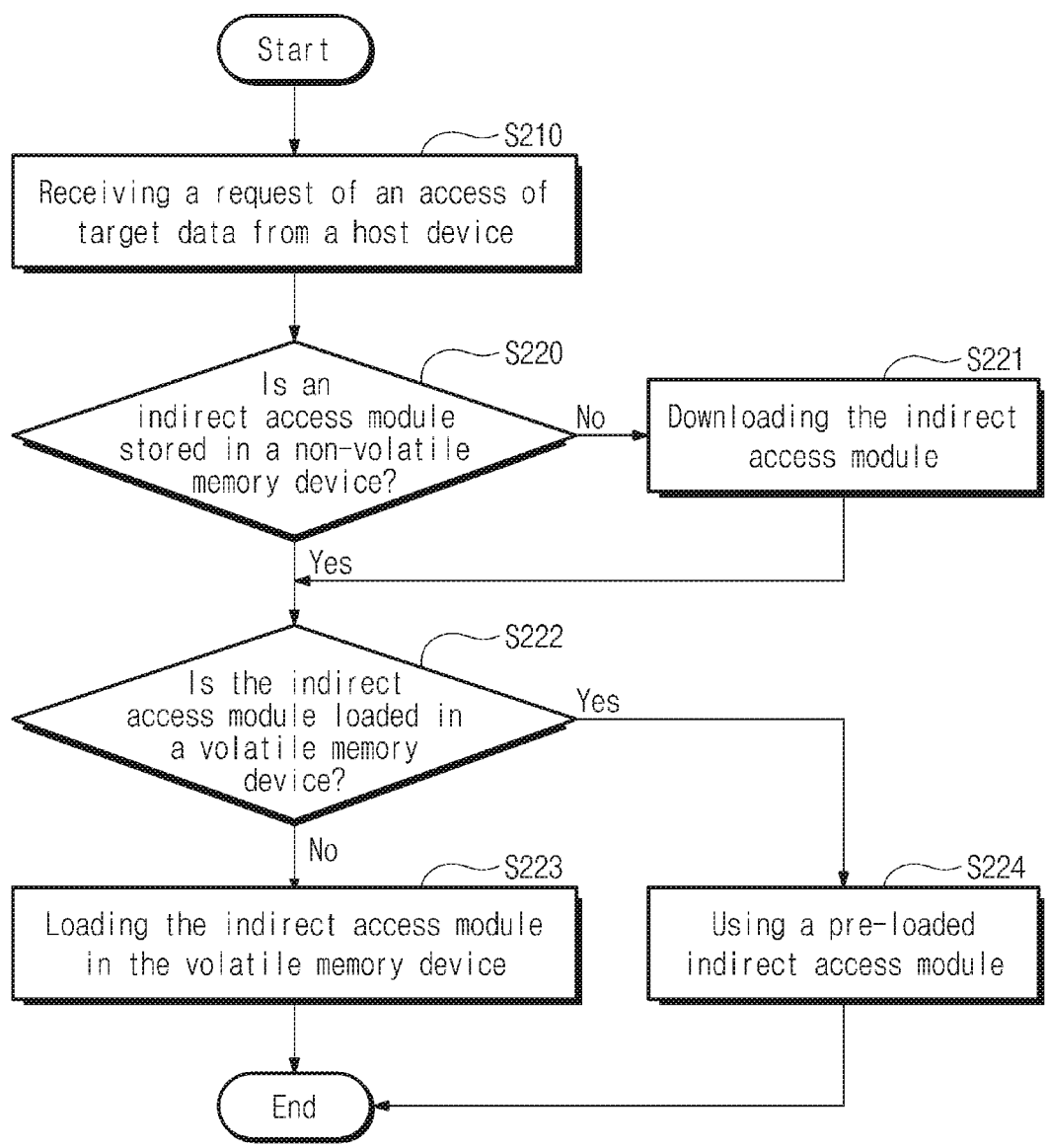
FIG. 10 is a flowchart describing a method of operating a storage device according to some embodiments of the present disclosure.

FIG. 10 is a flowchart describing a method of operating a storage device according to some embodiments of the present disclosure. A method of operating a storage device according to some embodiments of the present disclosure will be described with reference to FIG. 10. The storage device may communicate with a host device. The storage device may correspond to the storage device 100 of FIGS. 1, 5, 6, 7, and 8. Operation S210 is similar to operation S110 of FIG. 9, and thus, additional description will be omitted to avoid redundancy.

In operation S220, the storage device may determine whether an indirect access module is present in a non-volatile memory device. For example, the storage device may include a non-volatile memory device and a processor. As the processor executes instructions stored in the non-volatile memory device, the indirect access module may be implemented or executed. However, when the indirect access module is absent from the non-volatile memory device, an operation of downloading the indirect access module may be further required.

When it is determined in operation S220 that the indirect access module is absent from the non-volatile memory device, the storage device may perform operation S221. When it is determined in operation S220 that the indirect access module is present in the non-volatile memory device, the storage device may perform operation S222.

In operation S221, the storage device may download the indirect access module. For example, the storage device may download the indirect access module from the host device. The indirect access module may be stored in the non-volatile memory device of the storage device in the form of an instruction.

In operation S222, the storage device may determine whether the indirect access module is loaded. For example, the storage device may include a non-volatile memory device, a volatile memory device, and a processor. The operation S222 may determine whether the indirect access module loaded in the volatile memory device.

The non-volatile memory device may include instructions corresponding to the indirect access module. The instructions may be instructions stored in advance and may be the instructions downloaded through operation S221. As the processor executes instructions stored in the non-volatile memory device, the indirect access module may be loaded to the volatile memory device. The indirect access module loaded to the volatile memory device may process a request received from the host device. That is, the non-volatile memory device may be used as a firmware memory, and the volatile memory device may be used as a main memory.

When it is determined in operation S222 that the indirect access module is not loaded, the storage device may perform operation S223. Operation S223 may include loading the indirect access module in the volatile memory device. In some embodiments of S223, the recently-loaded indirect access module may then be used.

When it is determined in operation S222 that the indirect access module is loaded, the storage device may perform operation S224.

In operation S223, the storage device may load the indirect access module to the volatile memory.

In operation S224, the storage device may use a pre-loaded indirect access module. That is, because the indirect access module is already loaded to the volatile memory device, the pre-loaded indirect access module may be used without again loading the indirect access module.

Figure 11:
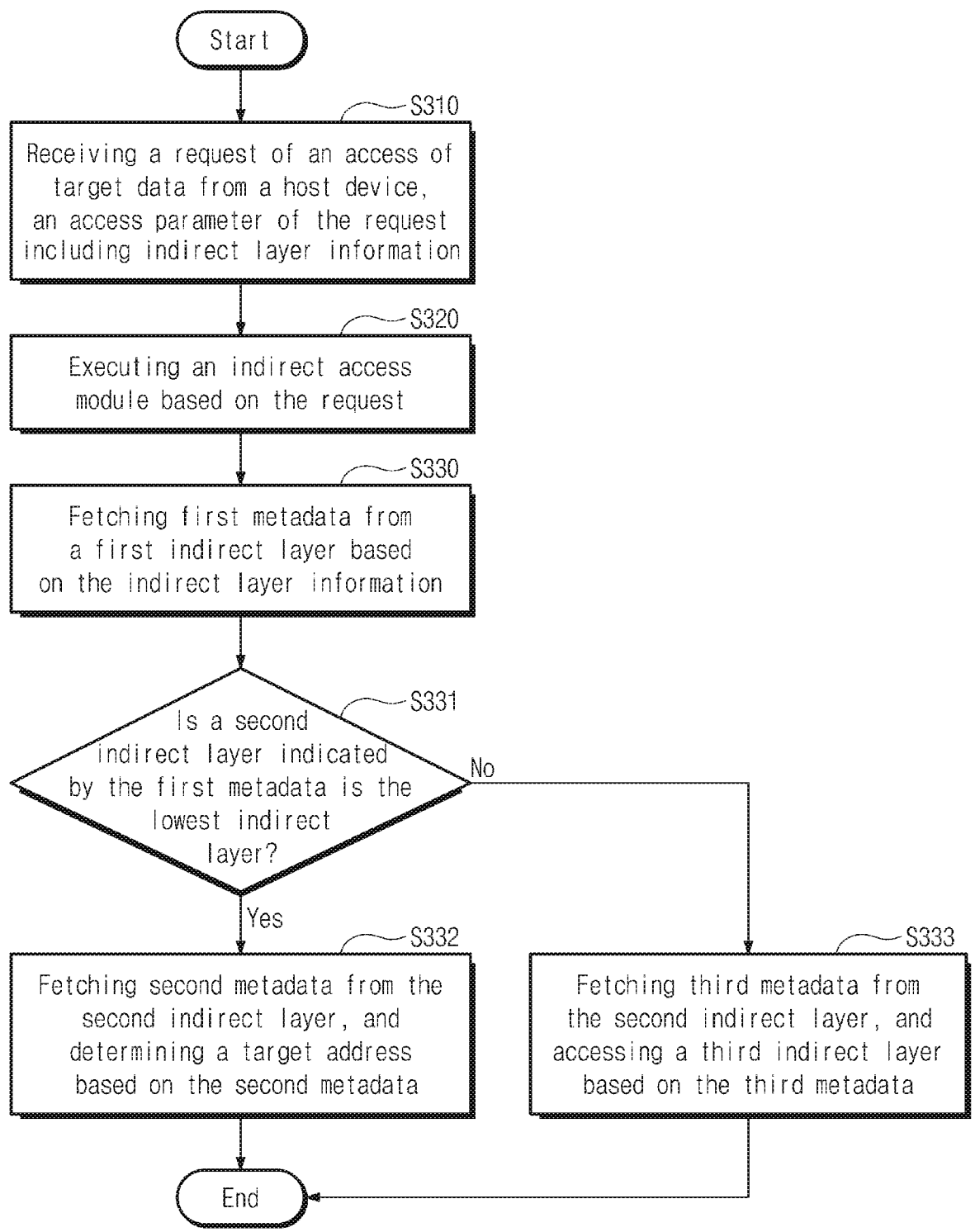
FIG. 11 is a flowchart describing a method of operating a storage device according to some embodiments of the present disclosure.

FIG. 11 is a flowchart describing a method of operating a storage device according to some embodiments of the present disclosure. A method of operating a storage device according to some embodiments of the present disclosure will be described with reference to FIG. 11. The storage device may communicate with a host device. The storage device may correspond to the storage device 100 of FIGS. 1, 5, 6, 7, and 8. Operation S320 is similar to operation S120 of FIG. 9, and thus, additional description will be omitted to avoid redundancy. The storage device may include an indirect access module.

In operation S310, the storage device may receive a request for the access to target data from the host device. For example, the access request may include an access parameter. The access parameter may include indirect layer information. The indirect layer information may point the first indirect layer in which metadata for accessing target data is present.

In this case, the first indirect layer may refer to only one of a plurality of indirect layers that the storage device supports, and the present disclosure is not limited thereto. For example, the first indirect layer may refer to the highest indirect layer or the lowest indirect layer. However, the first indirect layer is not limited to the highest indirect layer or the lowest indirect layer.

In some embodiments, the storage device may start a metadata-related operation (or metadata processing operation) from any other indirect layer being not the highest indirect layer from among the plurality of indirect layers. For example, the first indirect layer mentioned in operation S310 may not be the highest indirect layer of the plurality of indirect layers that the storage device supports. That is, the host device may request target data from an intermediate indirect layer, based on the cached metadata.

In operation S330, the indirect access module of the storage device may fetch first metadata from the first indirect layer based on the indirect layer information of the access parameter received in operation S310. The first metadata may point a location of second metadata included in the second indirect layer or a location of third metadata included in the second indirect layer. The second indirect layer may be a layer lower than the first indirect layer. For example, the second indirect layer may be closer to a data layer lower than the first indirect layer. The data layer may include the target data requested in operation S310.

In operation S331, the indirect access module of the storage device may determine whether the second indirect layer pointed by the first metadata is the lowest indirect layer. The lowest indirect layer may refer to a layer that is directly mapped onto the data layer. For example, metadata in the lowest indirect layer may indicate an address of data in a data layer.

When it is determined in operation S331 that the second indirect layer is the lowest indirect layer, the storage device may perform operation S332. When it is determined in operation S331 that the second indirect layer is not the lowest indirect layer, the storage device may perform operation S333.

In operation S332, the indirect access module of the storage device may fetch second metadata from the second indirect layer based on the first metadata. The indirect access module of the storage device may determine a target address based on the second metadata. For example, the second indirect layer may be the lowest indirect layer. The indirect access module of the storage device may determine the target address of the target data based on the second metadata in the second indirect layer being the lowest indirect layer.

In operation S333, the indirect access module of the storage device may fetch third metadata from the second indirect layer based on the first metadata. The indirect access module of the storage device may access the third indirect layer based on the third metadata. The third indirect layer may be a layer lower than the second indirect layer. For example, the third indirect layer may be closer to the data layer lower than the second indirect layer.

In some embodiments, the storage device may receive an access parameter including the indirect layer information indicating the lowest indirect layer. For example, in operation S330, the first indirect layer may be the lowest indirect layer. The first metadata may directly indicate the target address of the target data. In this case, operation S331, operation S332, and operation S333 may be omitted, and the indirect access module of the storage device may fetch the target data in the data layer based on the access parameter and the first metadata.

Figure 12:
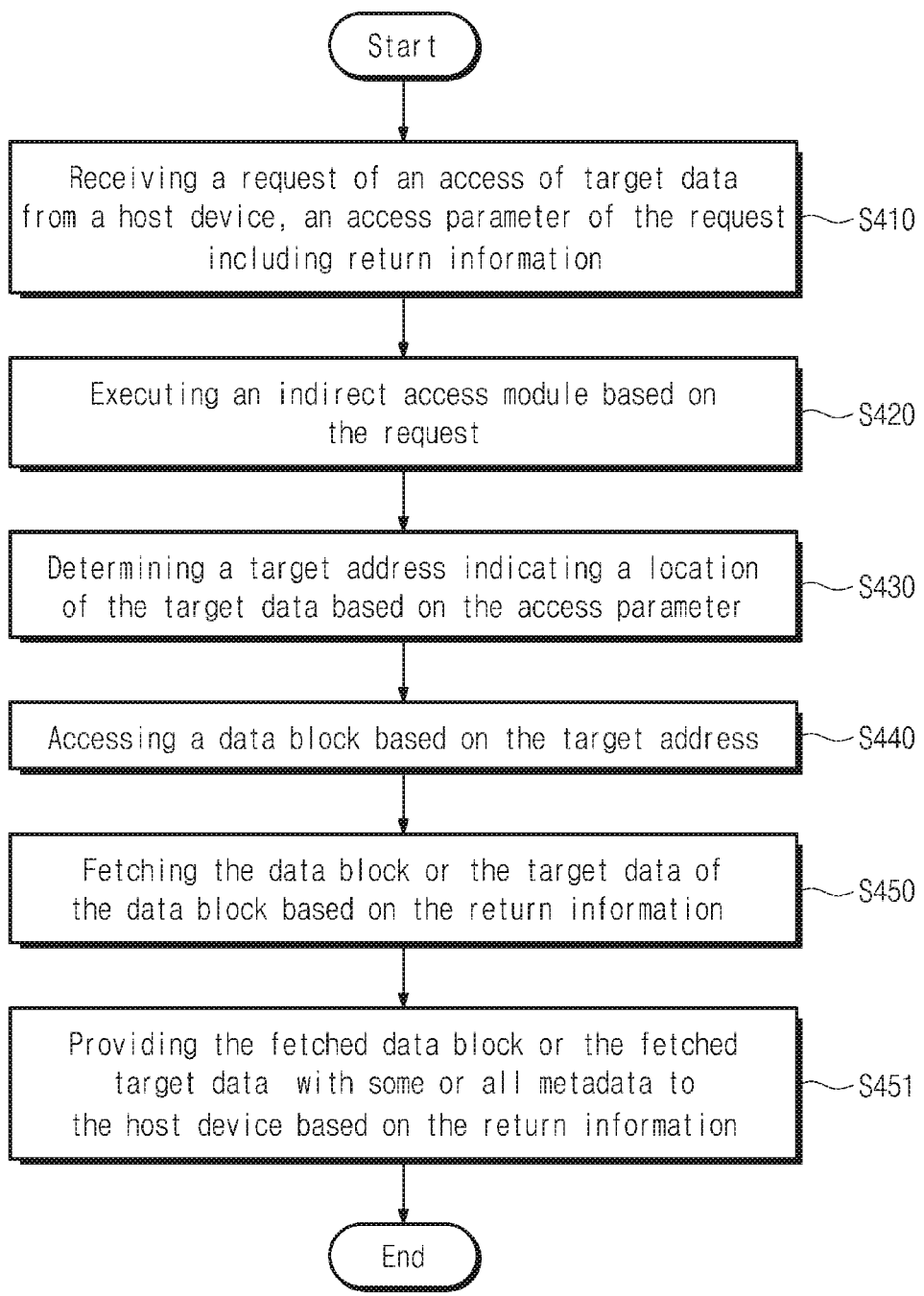
FIG. 12 is a flowchart describing a method of operating a storage device according to some embodiments of the present disclosure.

FIG. 12 is a flowchart describing a method of operating a storage device according to some embodiments of the present disclosure. A method of operating a storage device according to some embodiments of the present disclosure will be described with reference to FIG. 12. The storage device may communicate with a host device. The storage device may correspond to the storage device 100 of FIGS. 1, 5, 6, 7, and 8. Operation S420, operation S430, and operation S440 are similar to operation S120, operation S130, and operation S140 of FIG. 9, and thus, additional description will be omitted to avoid redundancy. The storage device may include an indirect access module.

In operation S410, the storage device may receive a request for the access to target data from the host device. The access request may include an access parameter. The access parameter may include return information. The return information may define a type of data to be returned to the host device 11 depending on the request.

For example, a return type may define whether to return target data or whether to return a data block including the target data. Alternatively, the return type may define whether to return metadata corresponding to the target data. In the case of returning metadata, the return type may define whether to return the metadata or whether to return a metadata block including the metadata. In the case where a plurality of metadata are used to obtain target data, the return type may define 1) at least one metadata to be returned to the host device from among the plurality of metadata, and 2) whether to return the at least one metadata to be returned or metadata blocks associated with the at least one metadata.

In operation S450, the indirect access module of the storage device may fetch the data block accessed in operation S440 or may fetch the target data in the data block. The target data may include the data requested in operation S410.

In operation S451, the indirect access module of the storage device may return the target data based on the return information. For example, based on the return information, the indirect access module of the storage device may provide the host device with the data block fetched in operation S450 or all the metadata or some metadata together with the target data fetched in operation S450.

Figure 13:
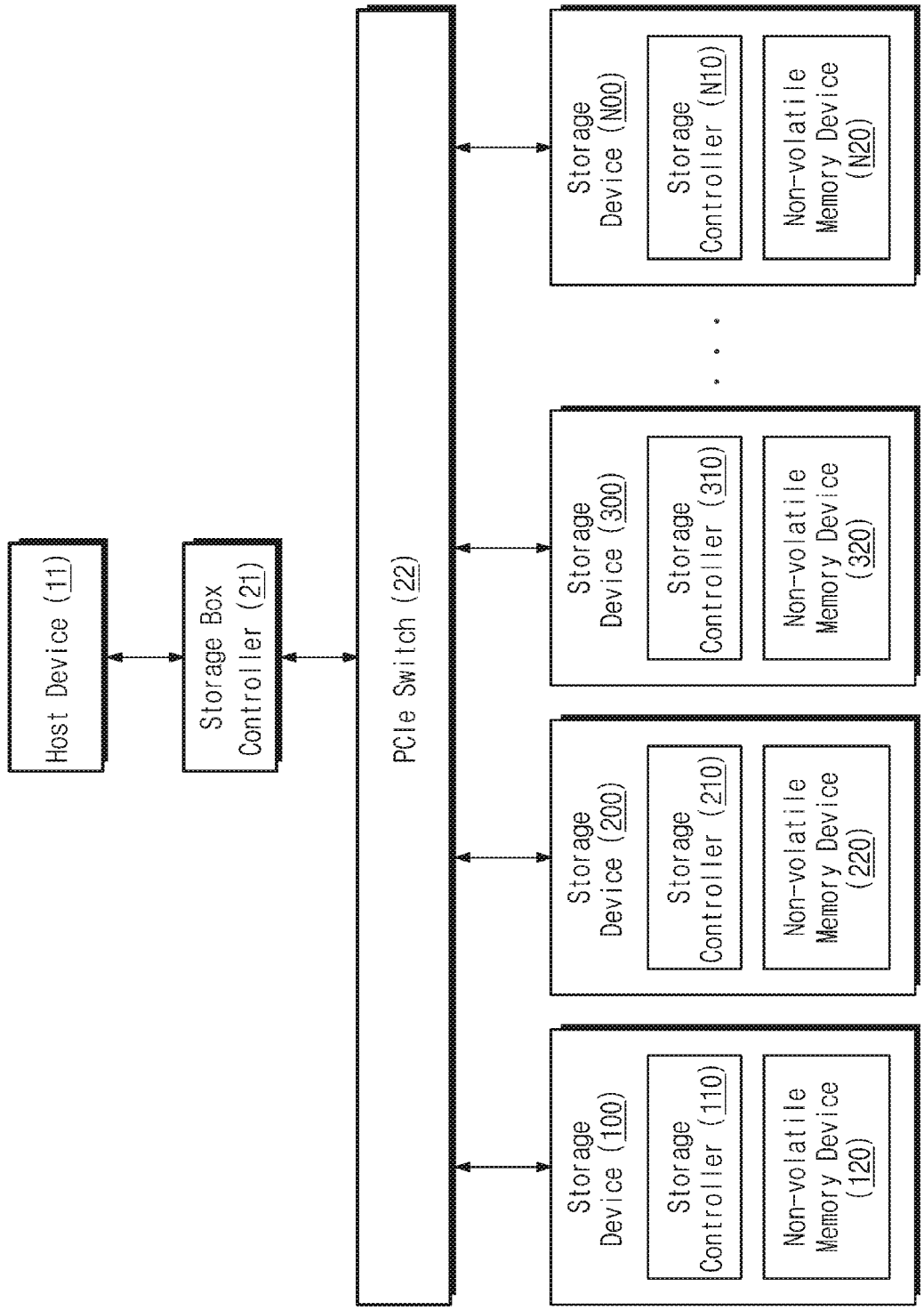
FIG. 13 is a block diagram of a storage system according to some embodiments of the present disclosure.

FIG. 13 is a block diagram of a storage system according to some embodiments of the present disclosure. A storage system according to some embodiments of the present disclosure will be described with reference to FIG. 13. A storage system 20 may correspond to the storage system 10 of FIG. 1. The storage system 20 may be also referred to as a "storage box" including two or more storage devices, for example storage device 100, storage device 200, storage device 300, . . . , storage device N00. As illustrated in FIG. 13, the two or more storage devices may include respective storage controllers 110, 210, 310, . . . , and N10 and respective non-volatile memory devices 120, 220, 320, . . . , and N20.

The storage system 20 may include the host device 11, a storage box controller 21, a PCIe switch 22, and a plurality of storage devices 100 to N00. The host device 11 may correspond to the host device 11 of FIG. 1.

The storage box controller 21 may communicate with the host device 11. The storage box controller 21 may communicate with the plurality of storage devices 100 to N00 through the PCIe switch 22. Each of the plurality of storage devices 100 to N00 may store data.

In some embodiments, the storage box controller 21 may include at least one indirect access module and a module manager. The module manager may manage the at least one indirect access module. The at least one indirect access module may assist an operation of processing metadata associated with a plurality of data respectively stored in the plurality of storage devices 100 to N00.

That is, an operation of the storage box controller 21 may be similar to the operation of the storage controller 110 of FIG. 1, and an operation of each of the plurality of storage devices 100 to N00 may be similar to the operation of the non-volatile memory device 120 of FIG. 1.

According to an embodiment of the present disclosure, a storage device including an indirect access module, a method of operating the same, and a method of operating a storage system including the same are provided.

Also, as the indirect access module processes metadata and provides the access to target data, a storage device in which the input/output load between a host device and the storage device is reduced and a data block access speed is improved, a method of operating the storage device, and a method of operating a storage system including the storage device are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A method of operating a storage device which communicates with a host device and includes a non-volatile memory device, the method comprising:
   receiving a request for an access to target data from the host device;
   executing an indirect access module based on the request;
   based on an access parameter of the request, determining, by the indirect access module, a target address indicating a location of the target data;
   accessing, by the indirect access module, a data block based on the target address; and
   providing, by the indirect access module, the host device with the accessed data block or the target data in the accessed data block,
   wherein the executing the indirect access module based on the request includes:
      determining whether the indirect access module is present in the non-volatile memory device of the storage device,
      based on determining that the indirect access module is absent, downloading the indirect access module from the host device, and
      executing the indirect access module.

2. The method of claim 1, wherein the storage device determines the target address from the access parameter automatically without receiving the target address from the host device.

3. The method of claim 1, wherein the storage device further includes a processor, and
   wherein, when instructions stored in the non-volatile memory device are executed by the processor, the indirect access module communicates with an operating system of the host device.

4. The method of claim 1, wherein the storage device includes a volatile memory device and the non-volatile memory device in which the indirect access module is stored, and
   wherein the executing of the indirect access module based on the request includes:
   determining whether the indirect access module is loaded to the volatile memory device;
   based on determining that the indirect access module is loaded, using the loaded indirect access module; and
   based on determining that the indirect access module is not loaded, loading the indirect access module stored in the non-volatile memory device to the volatile memory device.

5. The method of claim 1, wherein the determining of the target address indicating the location of the target data based on the access parameter of the request by the indirect access module includes:
   fetching, by the indirect access module, first metadata in a metadata block based on the access parameter; and
   determining the target address based on the access parameter and the first metadata thus fetched.

6. The method of claim 1, wherein the access parameter of the request includes indirect layer information indicating a first indirect layer, and
wherein the determining of the target address indicating the location of the target data based on the access parameter of the request by the indirect access module includes:
fetching, by the indirect access module, first metadata from the first indirect layer based on the access parameter;
determining whether a second indirect layer indicated by the first metadata is a lowest indirect layer;
based on determining that the second indirect layer is the lowest indirect layer, fetching second metadata from the second indirect layer; and
determining the target address based on the access parameter and the second metadata that has been fetched.

7. The method of claim 6, wherein the determining of the target address indicating the location of the target data based on the access parameter of the request by the indirect access module further includes:
based on determining that the second indirect layer is not the lowest indirect layer, fetching third metadata from the second indirect layer; and
accessing a third indirect layer based on the third metadata.

8. The method of claim 1, wherein the storage device includes a first indirect layer, a second indirect layer, and a data layer,
wherein the data layer includes the target data,
wherein the first indirect layer and the second indirect layer include first metadata and second metadata, respectively,
wherein the second indirect layer is farther from the data layer than the first indirect layer, and
wherein, before generating the request for the access to the target data, the host device generates the first metadata based on the second metadata, and generates the access parameter including the first metadata and indirect layer information indicating the first indirect layer.

9. The method of claim 1, wherein the access parameter of the request includes return information, and
wherein the providing of the host device with the accessed data block or the target data in the accessed data block by the indirect access module includes:
determining, by the indirect access module, whether to return metadata corresponding to the target data based on the return information;
based on determining to return the metadata, determining, by the indirect access module, whether to return the metadata or to return a metadata block including the metadata, based on the return information; and
determining, by the indirect access module, whether to return the target data or to return the accessed data block including the target data, based on the return information.

10. The method of claim 1, wherein the indirect access module is compatible with a Linux operating system, and
wherein the access parameter of the request is used to process at least one of a direct pointer, an indirect pointer, a double indirect pointer, and a triple indirect pointer of an inode block.

11. The method of claim 1, wherein the indirect access module is compatible with a RocksDB, and
wherein the access parameter of the request is used to process a metaindex handler and an index handler of a footer.

12. A method of operating a storage system which includes a host device and a storage device, and the storage device includes a non-volatile memory device, the method comprising:
providing, by the host device, a request for an access to target data;
executing, by the storage device, an indirect access module based on the request;
determining, by the indirect access module, a target address indicating a location of the target data based on an access parameter of the request;
accessing, by the indirect access module, a data block based on the target address; and
providing, by the indirect access module, the host device with the accessed data block or the target data in the accessed data block,
wherein the executing the indirect access module based on the request includes:
determining whether the indirect access module is present in the non-volatile memory device of the storage device, and
based on determining that the indirect access module is absent, downloading the indirect access module from the host device.

13. The method of claim 12, wherein the storage device further includes a volatile memory device, and
wherein the executing of the indirect access module based on the request by the storage device includes:
based on determining that the indirect access module is present, determining whether the indirect access module is loaded to the volatile memory device;
based on determining that the indirect access module is loaded, using loaded indirect access module; and
based on determining that the indirect access module is not loaded, loading the indirect access module stored in the non-volatile memory device to the volatile memory device.

14. A storage device comprising:
a non-volatile memory device configured to store a plurality of data sets;
a first indirect access module configured to manage a first data set of the plurality of data sets;
a host interface circuit configured to communicate with a host device; and
a module manager configured to receive a first request for a first access to first target data from the host device through the host interface circuit and to execute the first indirect access module based on the first request,
wherein the module manager is further configured to execute the first indirect access module based on the first request by:
determining whether the first indirect access module is present in the non-volatile memory device of the storage device, and
based on determining that the first indirect access module is absent, downloading the first indirect access module from the host device,
wherein the first data set includes a first target data block including the first target data and a first metadata block including first metadata, and
wherein the first indirect access module, when executed by the module manager, is configured to:

determine a first target address indicating a first location of the first target data, based on a first access parameter of the first request and the first metadata;

access the first target data block based on the first target address; and provide the host interface circuit with the first target data block that has been accessed or the first target data in the first target data block that has been accessed.

15. The storage device of claim 14, further comprising:

a second indirect access module configured to manage a second data set of the plurality of data sets, wherein the module manager is further configured to:

receive a second request for a second access to second target data from the host device through the host interface circuit; and execute the second indirect access module based on the second request, wherein the second data set includes a second target data block including the second target data and a second metadata block including second metadata, and wherein the second indirect access module, when executed by the module manager, is further configured to:

determine a second target address indicating a second location of the second target data, based on a second access parameter of the second request and the second metadata;

access the second target data block based on the second target address; and provide the host interface circuit with the second target data block thus accessed or the second target data in the second target data block thus accessed.

16. The storage device of claim 15, wherein an operating system of the host device executes a first application and a second application, and wherein the first data set corresponds to the first application, and the second data set corresponds to the second application.

17. The storage device of claim 14, wherein the first data set includes a first indirect layer, a second indirect layer, a third indirect layer, a fourth indirect layer, and a data layer, wherein the fourth indirect layer includes the first metadata block, wherein the data layer includes the first target data block, wherein the first metadata correspond to a triple indirect pointer, and wherein the first indirect access module, when executed by the module manager, is further configured to:

access the third indirect layer based on the first access parameter of the first request and the triple indirect pointer;

access the second indirect layer based on a double indirect pointer of the third indirect layer;

access the first indirect layer based on an indirect pointer of the second indirect layer; and determine the first target address based on a direct pointer of the first indirect layer.

18. The storage device of claim 14, wherein the module manager is further configured to:

based on the first indirect access module being present in the non-volatile memory device, determine whether the first indirect access module is loaded to a volatile memory device of the storage device;

based on determining that the first indirect access module is loaded, use the first indirect access module; and based on determining that the first indirect access module is not loaded, load the first indirect access module stored in the non-volatile memory device to the volatile memory device.

19. The storage device of claim 14, wherein the first access parameter of the first request includes return information, and wherein the first indirect access module, when executed by the module manager, is further configured to:

determine whether to return the first metadata based on the return information;

based on determining to return of the first metadata, determine whether to return the first metadata block or to return the first metadata based on the return information; and determine whether to return the first target data block or to return the first target data, based on the return information.

* * * * *